(12) United States Patent
Tremblay et al.

(10) Patent No.: US 7,677,313 B2
(45) Date of Patent: Mar. 16, 2010

(54) METHOD FOR CONTROLLING WATER INFLUX INTO WELLBORES BY BLOCKING HIGH-PERMEABILITY CHANNELS

(75) Inventors: Bernard Tremblay, Regina (CA); Haibo Huang, Edmonton (CA); Ron Sawatzky, Edmonton (CA); Douglas A. Lillico, Edmonton (CA); Zhihong (John) Zhou, Edmonton (CA)

(73) Assignee: Alberta Science and Research Authority (CA)

( * ) Notice: Subject to any disclaimer, the term of this patent is extended or adjusted under 35 U.S.C. 154(b) by 75 days.

(21) Appl. No.: 11/574,843

(22) PCT Filed: Sep. 13, 2005

(86) PCT No.: PCT/CA2005/001389

§ 371 (c)(1),
(2), (4) Date: Mar. 7, 2007

(87) PCT Pub. No.: WO2006/029510

PCT Pub. Date: Mar. 23, 2006

(65) Prior Publication Data

US 2008/0047709 A1  Feb. 28, 2008

(30) Foreign Application Priority Data

Sep. 15, 2004  (CA) .................................... 2481735

(51) Int. Cl.
*E21B 33/138*  (2006.01)

(52) U.S. Cl. ....................................... 166/293; 166/300

(58) Field of Classification Search ........................ None
See application file for complete search history.

(56) References Cited

U.S. PATENT DOCUMENTS

| | | | |
|---|---|---|---|
| 3,949,811 | A | 4/1976 | Threlkeld et al. |
| 4,606,407 | A | 8/1986 | Shu |
| 4,613,631 | A | 9/1986 | Espenscheid et al. |
| 4,683,949 | A | 8/1987 | Sydansk et al. |

(Continued)

FOREIGN PATENT DOCUMENTS

CA   1246856   12/1988

(Continued)

OTHER PUBLICATIONS

Sawatzky, R.P. et. al., "Tracking Cold Production Footprints," Paper 2002-086 presented at The Petroleum Society's Canadian Int'l. Petroleum Conf., 2002, Calgary, Alberta, Jun. 11-13, 2002.

(Continued)

*Primary Examiner*—Zakiya W. Bates
(74) *Attorney, Agent, or Firm*—Terrence N. Kuharchuk; Rodman & Rodman

(57) ABSTRACT

A method of blocking a high permeability channel in communication with a wellbore, including the steps of introducing an amount of an unreinforced gel into the high permeability channel via the wellbore and introducing an amount of a reinforced gel comprising an amount of a reinforcing material into the high permeability channel via the wellbore. The method may further include the step, after introducing the unreinforced gel and the reinforced gel into the high permeability channel, of introducing an amount of a chaser fluid into the wellbore.

45 Claims, 11 Drawing Sheets

U.S. PATENT DOCUMENTS

| | | | |
|---|---|---|---|
| 4,688,639 A | 8/1987 | Falk | |
| 4,722,397 A | 2/1988 | Sydansk et al. | |
| 4,744,418 A | 5/1988 | Sydansk | |
| 4,770,245 A | 9/1988 | Sydansk | |
| 4,834,182 A | 5/1989 | Shu | |
| 4,844,168 A | 7/1989 | Sydansk | |
| 4,980,393 A | 12/1990 | Shu | |
| 4,981,520 A | 1/1991 | Hoskin et al. | |
| 5,377,760 A | 1/1995 | Merrill | |
| 5,849,674 A | 12/1998 | Fox et al. | |
| 6,143,699 A | 11/2000 | Zhou | |
| 6,720,292 B1 * | 4/2004 | Zhou et al. | 507/276 |
| 7,350,572 B2 * | 4/2008 | Fredd et al. | 166/279 |

FOREIGN PATENT DOCUMENTS

| | | |
|---|---|---|
| CA | 1258734 | 8/1989 |
| CA | 1261605 | 9/1989 |
| CA | 1275792 | 11/1990 |
| CA | 1285134 | 6/1991 |
| CA | 2060159 | 12/1992 |
| CA | 2086599 | 8/1995 |
| CA | 2211319 | 1/1998 |
| CA | 2336439 | 9/2001 |

OTHER PUBLICATIONS

Hayes, Kirby, "Perforating for Heavy Oil Cold Production in North West Saskatchewan and North East Alberta, Canada", OTS Heavy Oil Science Centre, 1998 (2 pages).

Seright, R.S., "Gel Placement in Fractured Systems," SPE Production and Facilities, 241-248, Nov. 1995.

Zhou, Z.J., "Clay Gel for Water Shut-Off in Heavy Oil Production," presented at 1998 CIM Heavy Oil Technical Symposium, Lloydminster, Alberta, Canada, Sep. 16-17, 1998.

Squires, A., "Inter-Well Tracer Results and Gel Blocking Program," paper presented at 10th Annual Heavy Oil and Oil Sands Technical Symposium, Mar. 9, 1993.

Tremblay, B., et. al., "Development and Testing of a Sandy Polyacrylamide Gel for Water Shut-Off of Large Channels," Alberta Research Council, AACI Report 0102-2, Jan. 2002.

Wiwchar, B., et. al., "Produced Sand Reinforced Polymer Gel: Application for Water Shut-Off in Cold Production," Alberta Research Council, AACI Report#0001-5, Jun. 2000.

Gheissary, G., et. al., "Unexpected phenomena observed in particle settling in non-Newtonian media," Journal of Non-Newtonian Fluid Mechanics, 67, Jan. 18, 1996.

Dovan, H.T., et. al., "Delaying Gelation of Aqueous Polymer at Elevated Temperatures Using Novel Organic Crosslinkers," SPE Paper 37246, presented in Houston, Texas, USA, Feb. 18-21, 1997.

Bailey, B. et. al., "Water Control", Oilfield Review, Spring 2000, pp. 30-51.

Dusseault, Maurice B., Abstract entitled "New Oil Production Technologies" to be presented Jan. 15, 2003 at SPE Technical Luncheon in Edmonton, Alberta, Canada.

Article entitled "Modeling Cold Production for Heavy Oil Reservoirs", Reservoir Technology, Winter 1998, pp. 1-4, provided by Epic Consulting Services Ltd.

Dusseault, Maurice, article entitled "New Technology for Heavy Oil and Oil Sands" downloaded from www.rense.com, undated (6 pages).

Shao, J.F., article entitled "Modeling of sand production in heavy oil as fluidized solid flow", undated (1 page).

Chen, Sandy et. al., article entitled "Do Wormholes Play a Role in Heavy Oil Cold Production?", Department of Geology and Geophysics, University of Calgary, Alberta, Canada, undated (4 pages).

Sawatzky, Ron, article entitled "In Situ Recovery Methods for Heavy Oil and Bitumen", 2004 CSEG National Convention (2 pages).

"Polymer Gel Technology", Marathon Oil Corporation downloaded from www.marathon.com, copyright 2003 (2 pages).

* cited by examiner

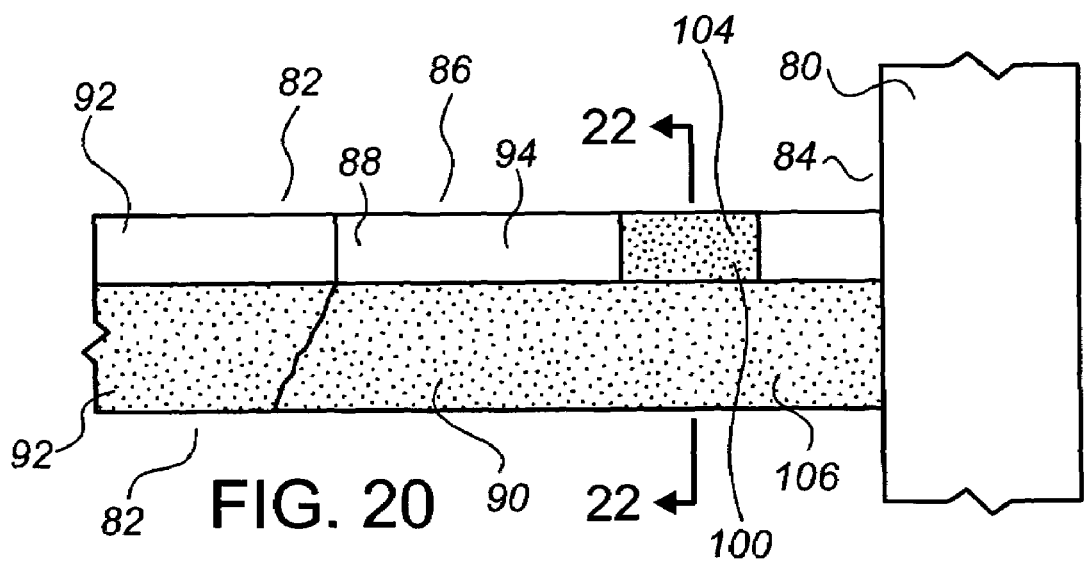
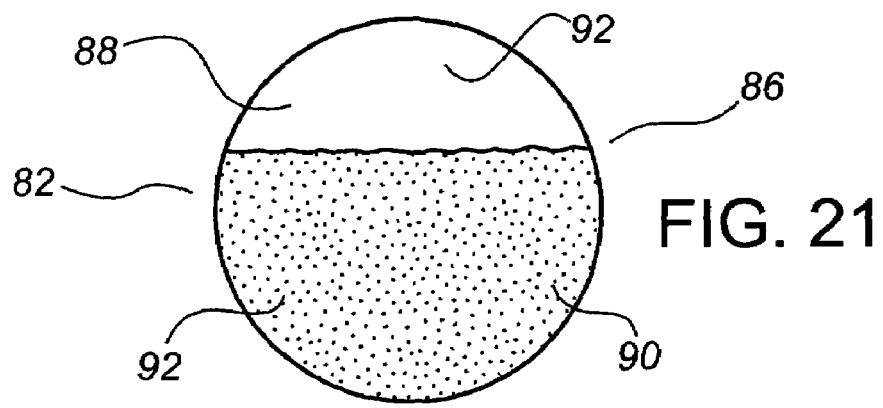
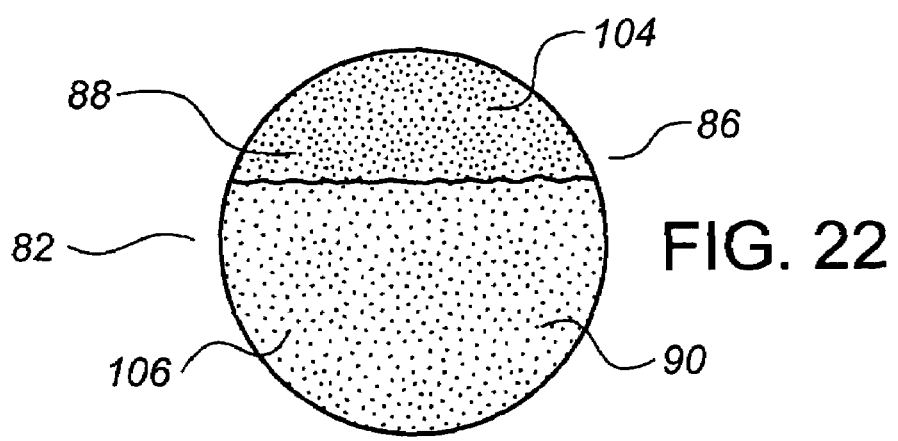

METHOD FOR CONTROLLING WATER INFLUX INTO WELLBORES BY BLOCKING HIGH-PERMEABILITY CHANNELS

TECHNICAL FIELD

A method for controlling water influx into wellbores through high permeability channels by blocking the high permeability channels.

BACKGROUND OF THE INVENTION

Cold production of heavy oil is a non-thermal process for heavy oil recovery in which sand and oil are produced simultaneously. The oil is widely believed to flow to the wellbore and to be drained from the reservoir through a network of highly permeable channels called wormholes. In this process, large volumes of sand are produced. The drive mechanism is generally thought to be solution gas drive. The enhanced reservoir access due to the produced sand, in combination with the solution gas drive, provides sustainable production rates for long periods (Sawatzky, R. P., Lillico, D. A., London, M. J., Tremblay, B. R. and Coates, R. M., "Tracking Cold Production Footprints", Paper 2002-086 Presented at The Petroleum Society's Canadian International Petroleum Conference, 2002, Calgary, Alberta, Jun. 11-13, 2002).

Despite the commercial success of cold production, the process is confronted with water breakthrough leading to loss of oil productivity and additional water disposal costs. Wormholes often break into edge and/or bottom water or aquifers, leading to water cuts as high as 99% and resulting in many oil wells being prematurely abandoned. In 1997, more than three billion barrels of water were produced with water to oil ratio of 6:1 in Western Canada (AEUB, "Alberta Field/Pool Production and Injection Monthly," Alberta Energy and Utility Board, Statistical Series, 97-16A, 1997).

Most of the work on water shut-off and reservoir conformance control treatments using polymer gel systems has been conducted on porous media. Some work has been done on blocking fractures (Seright, R. S. "Gel Placement in Fractured Systems," SPE Production and Facilities, 241-248, November 1995). Given the larger diameter of the wormholes compared to the porous medium, or even to a typical fracture width, polymer gels, without reinforcing materials, would tend to form a weak gel plug.

Previously, Zhou et. al. developed a clay-gel system for water shut-off in fractured reservoirs (Zhou et. al., "Process for Reducing Permeability in a Subterranean Formation," U.S. Pat. No. 6,143,699 issued Nov. 7, 2000; Zhou, Z. J., "Clay Gel for Water Shut-off in Heavy Oil Production," presented at the 1998 CIM Heavy Oil Technical Symposium, Lloydminster, Alberta, Canada, Sep. 16-17, 1998).

In this method, the clay gel swells once in contact with formation water through cation exchange between the potassium cations in the clay gel and the sodium cations in the formation to form a clay gel plug. The use of clay gels, which seemingly provide a clay gel plug of sufficient strength for fractures, is limited by the formation salinity, which must be below about 3 weight %. Field-testing of the method showed that a clay gel plug was able to reduce the water cut to 60% for the first three weeks. However, the water cut increased back to 85% afterwards. Two possible explanations, among others, may be given for the ultimate failure of the treatment: 1) a low yield stress (strength) of the clay gel plug; and/or 2) fingering of the fresh water into the clay gel within the wormholes during the post-flush treatment.

An analysis of a tracer study conducted by Amoco (Squires, A., "Inter-Well Tracer Results and Gel Blocking Program," paper presented at the Tenth Annual Heavy Oil and Oil Sands Technical Symposium, Mar. 9, 1993) investigating the connectivity of wormhole channels between wells provides an estimate of the diameter of the open channel portion of a wormhole between the subject wells. From the injection rate between two wells in one test (30 m$^3$/day), the distance between the two wells (400 m) and the travel time between the wells at the level of the perforations (one hour), the diameter of the open channel portion was calculated to be 6 cm. In this calculation, the injector and producer wells were assumed to be connected by a single wormhole. When two wormholes from different wells connect, the bottom hole pressure within each well would have a tendency to equalize. This equalization would reduce the tendency of forming additional channel connections between wellbores, so that the assumption of a single connecting wormhole between the subject wells is a reasonable assumption.

Based upon the Amoco tracer study, a gel system for plugging or blocking high permeability channels such as wormholes preferably has enough strength as a gel plug to block an open channel having a diameter of at least about 6 cm. Numerical simulations of the erosion at the surface of the open channel portions of wormholes suggest that the open channel portions of wormholes could be as large as 10 cm. in diameter (Tremblay, B., Wiwchar, B., Huang, H., Bani, E., Cameron, S. and Polikar, M., "Development and Testing of a Sandy Polyacrylamide Gel for Water Shut-off of Large Channels," Alberta Research Council, AACI Report 0102-2, January 2002).

A gel system for blocking high permeability channels such as wormholes should preferably also satisfy the following criteria: a) the gel should be capable of being placed at an appropriate location in order to perform the blocking function; b) the resulting gel plug should have sufficient strength to withstand formation pressure; and c) the gel system and its use should provide relatively low cost with minimum environmental impact.

The proper placement of the gel is dependent upon proper selection of the gel system and proper preparation of the gel. Preferably, the injection pressures for the gel should not be excessive, the gel should be capable of flowing through casing perforations into the high permeability channels, and the gel should be capable of penetrating as far as possible into the high permeability channels.

The strength of the resulting gel plug is dependent upon the composition of the gel. In order to be effective, the gel plug should have enough strength to withstand the formation water pressures typically encountered downhole, which pressures could reach about 3 to 4 MPa in cold production wells. Reinforced gels have been proposed as gel systems which may provide suitable strength as reinforced gel plugs to withstand downhole pressures.

SUMMARY OF THE INVENTION

The present invention is a method for blocking one or more high permeability channels which are in communication with a wellbore, wherein a "high permeability channel" is any path or channel which is in communication with a wellbore and which exhibits a significantly higher permeability than the average permeability of the formation surrounding the wellbore.

As one example, a high permeability channel may be comprised of one or more fractures or irregularities within the formation. As a second example, a high permeability channel may be comprised of one or more gaps or voids in the formation surrounding the wellbore or adjacent to the wellbore, which gaps or voids may be naturally occurring within the formation or may be formed during drilling, completion or production of the wellbore. Such gaps or voids may in some circumstances be present between a casing in the wellbore and the wall of the wellbore and may not be filled with cement, due to problems encountered during the cementing process. In some preferred applications of the method of the invention, the high permeability channels are comprised of wormholes, such as wormholes associated with heavy oil reservoirs which have been produced by the use of Cold Heavy Oil Production with Sand ("CHOPS") techniques.

Preferably the high permeability channels are comprised of an open channel portion and a loose material portion. The open channel portion is comprised substantially of a void. The loose material portion is comprised of loose or loosely compacted unconsolidated solid material.

The method is comprised of a sequential gel treatment which is applied to the wellbore and thus the high permeability channels. The method may possibly be employed using any type or types of gel system, including a wide range of clay gels and chemical gels, but is most preferably employed using polymer gel systems.

In some preferred embodiments, the method of the invention preferably selectively blocks wormholes associated with cold production wells which have experienced water breakthrough and thus tend to produce relatively high percentages of water at the wellbore. It is believed that the gel treatment of the invention will preferentially infiltrate wormholes which have experienced water breakthrough, due to the relatively low viscosity of water in comparison with the viscosity of hydrocarbons such as heavy oil. In other words, it is easier to displace water in wormholes than it is to displace hydrocarbons in wormholes. As a result, the method of the invention is particularly suited for use where the viscosity of the hydrocarbons being produced by the wellbore is relatively high, since these conditions will increase the extent to which the gel treatment will preferentially infiltrate wormholes which contain a large proportion of water.

Wormholes resulting from cold production processes typically include both the open channel portion and the loose material portion.

The reservoir formation surrounding such wormholes typically comprises a sand matrix of relatively densely compacted but unconsolidated sand. Heavy oil is contained within this sand matrix, and the permeability of the sand matrix is typically much lower than the permeability of either the open channel portion or the loose material portion of the wormhole.

The goal of the gel treatment method of the invention is to effectively treat a high permeability channel so that water is substantially blocked from passing through the high permeability channel. Where the high permeability channel is comprised of a wormhole including both an open channel portion and a loose material portion, the goal of the gel treatment method is to effectively treat both the open channel portion and the loose material portion of the wormhole so that water is substantially blocked from passing through the wormhole.

It has been found that the effective treatment of high permeability channels such as wormholes is difficult to achieve by introducing only an unreinforced gel into the wormhole or by introducing only a reinforced gel into the wormhole. It has, however, also been found that wormholes may be effectively treated by introducing both an unreinforced gel and a reinforced gel into the wormhole sequentially.

As a result, in one aspect, the invention is a method of blocking a high permeability channel in communication with a wellbore, comprising:
(a) introducing an amount of an unreinforced gel into the high permeability channel via the wellbore; and
(b) introducing an amount of a reinforced gel comprising an amount of a reinforcing material into the high permeability channel via the wellbore.

The unreinforced gel and the reinforced gel are preferably introduced into the high permeability channel by injecting them into the high permeability channel via the wellbore.

The unreinforced gel and the reinforced gel may be introduced in a single sequence. Alternatively the method may be comprised of the steps of alternatively introducing one or more amounts of an unreinforced gel and one or more amounts of a reinforced gel into the high permeability channel. Each of the amounts of the unreinforced gel may be the same or they may be different. Similarly, each of the amounts of the reinforced gel may be the same or they may be different.

The unreinforced gel may be comprised of any type of gel, including a clay gel, a chemical gel and combinations thereof. Preferably the unreinforced gel is comprised of a chemical gel instead of a clay gel. More preferably the unreinforced gel is formed from starting materials comprising a polymer gelling agent and a cross-linker.

In some preferred embodiments, the unreinforced gel is comprised of a solution comprising a polyacrylamide gelling agent and a cross-linker, such as for example a MARCIT$^{SM}$ or a MARA-SEAL$^{SM}$ gel developed by Marathon Oil Corporation. The MARCIT$^{SM}$ gel is comprised of a relatively high molecular weight polyacrylamide gelling agent. The MARA-SEAL$^{SM}$ gel is comprised of a relatively low molecular weight polyacrylamide gelling agent.

In a particular preferred embodiment the unreinforced gel is comprised of a MARA-SEAL$^{SM}$ gel comprising a solution of a polyacrylamide gelling agent sold under the trade name J491 by Marathon Oil Corporation.

Where the unreinforced gel includes a cross-linker, any cross-linker which is suitable for use with the gelling agent may be used. In embodiments in which the unreinforced gel is comprised of a polyacrylamide gel, the cross-linker may, for example, be comprised of chromium acetate.

The reinforced gel may be comprised of the same gel as the unreinforced gel or may be comprised of a different gel. Preferably the reinforced gel is comprised of the same gel as the unreinforced gel. Preferably the reinforced gel is comprised of a chemical gel instead of a clay gel. More preferably the reinforced gel is formed from starting materials comprising a polymer gelling agent and a cross-linker.

In some preferred embodiments, the reinforced gel is comprised of a solution comprising a polyacrylamide gelling agent and a cross-linker, such as for example a MARCIT$^{SM}$ or a MARA-SEAL$^{SM}$ gel developed by Marathon Oil Corporation.

In a particular preferred embodiment the reinforced gel is comprised of a MARA-SEAL$^{SM}$ gel comprising a solution of a polyacrylamide gelling agent sold under the trade name J491 by Marathon Oil Corporation.

Where the reinforced gel includes a cross-linker, any cross-linker which is suitable for use with the gelling agent may be used. In embodiments in which the reinforced gel is comprised of a polyacrylamide gel, the cross-linker may, for example, be comprised of chromium acetate.

The reinforced gel is further comprised of a reinforcing material. The reinforcing material may be comprised of any suitable solid reinforcing material. For example, the reinforcing material may be comprised of any suitable natural or synthetic particles or fibers. Preferably the reinforcing material is comprised of sand, gravel or crushed rock. More preferably the reinforcing material is comprised of sand. The sand may be comprised of produced sand or may be comprised of a graded sand product.

The reinforcing material is preferably comprised of relatively fine particles in order to minimize the tendency of the reinforcing material to settle out from the reinforced gel. Preferably the reinforcing material is substantially comprised of particles which have a particle size less than about 70 mesh. More preferably the reinforcing material is substantially comprised of particles which have a particle size less than about 100 mesh.

The reinforcing material preferably also has a relatively wide particle size distribution in order to minimize the tendency of the reinforcing material to settle out from the reinforced gel and to maximize the yield stress of the reinforced gel. For the purposes of the invention, a 70/140 sand has a relatively narrow particle size distribution, while a produced sand has a relatively wide particle size distribution. If the reinforcing material has a relatively wide particle size distribution, the largest particles in the reinforcing material may be relatively more coarse than if the reinforcing material has a relatively narrow particle size distribution, since the relatively wide particle size distribution provides a hindrance effect which reduces the tendency of the reinforcing material to settle.

The reinforced gel may be comprised of any amount of the reinforcing material which is effective to provide the desired properties of the reinforced gel. Preferably the reinforced gel is comprised of between about 50 weight % and about 70 weight % of the reinforcing material. More preferably the reinforced gel is comprised of about 60 weight % of the reinforcing material.

The reinforced gel may optionally be further comprised of an amount of a clay, for providing a hindrance effect which reduces the tendency of the reinforcing material to settle out from the reinforced gel. Preferably the type of clay which is included in the reinforced gel and the amount of the clay is such that the viscosity of the reinforced gel is not substantially increased relative to a comparable reinforced gel which does not comprise clay. As a result, the amount of clay is preferably minimized. For example, the amount of clay may be less than about 20 weight % of the reinforced gel, preferably the amount of clay is not greater than between about 10 weight % and about 15 weight % of the reinforced gel, and more preferably, the amount of clay is not greater than about 5 weight % of the reinforced gel.

Where the reinforced gel is comprised of an amount of a clay, the reinforced gel may be redesigned to take advantage of the presence of the clay. For example, the particle size of the reinforcing material may possibly be increased, a lower molecular weight gelling agent may possibly be utilized, or a lower concentration of gelling agent may possibly be utilized, all because of the hindrance effect of the clay upon the reinforcing material in the reinforced gel and the resulting alteration of the settling characteristics of the reinforced gel.

The method may be further comprised of the step of preparing the unreinforced gel. The unreinforced gel preparing step may be comprised of the following steps:

(a) hydrating the gelling agent to form a gelling agent solution; and
(b) adding a cross-linker to the gelling agent solution.

The method may be further comprised of the step of preparing the reinforced gel. The reinforced gel preparing step may be comprised of the following steps:

(a) hydrating the gelling agent to form a gelling agent solution;
(b) adding the reinforcing material to the gelling agent solution; and
(c) adding a cross-linker to the gelling agent solution.

Preferably the step of adding the cross-linker to the gelling agent solution in preparing both the unreinforced gel and the reinforced gel is performed substantially immediately before performing the step of introducing the gel into the high permeability channel.

The method may be further comprised of the step of introducing an amount of a chaser fluid into the wellbore and preferably into the high permeability channel in order to push the reinforced gel away from the wellbore and further into the high permeability channel, so that the reinforced gel does not interfere with the wellbore. Preferably the chaser fluid is injected into the wellbore, and preferably the chaser fluid is injected into the wellbore soon after the reinforced gel is introduced into the high permeability channel so that the reinforced gel does not have an opportunity to "set" in the wellbore. Where it is not necessary or desirable to push the reinforced gel away from the wellbore, the step of introducing the chaser fluid may be omitted.

The chaser fluid may be comprised of any fluid which is capable of displacing the reinforced gel and which either can remain in the wellbore without interfering with the wellbore or can be flushed from the wellbore before interfering with the wellbore. Preferably the chaser fluid is comprised of water. More preferably the chaser fluid is comprised of produced water or formation water which is obtained from the wellbore to be treated or from a different wellbore.

Preferably, the method is further comprised of shutting in the wellbore following the gel treatment for a period of time in order to allow for gelation of the unreinforced gel and the reinforced gel. The period of time may range from several days to several weeks, or longer.

The method of the invention may be used in various applications. A first exemplary application is a "reactivation application". A second exemplary application is a "sacrificial application". A third exemplary application is a "completion application". A fourth exemplary application is a "multilateral application".

BRIEF DESCRIPTION OF DRAWINGS

FIGS. 17-20 are schematic drawings depicting the sequence of a preferred embodiment of the method of the invention.

FIG. 21 is a schematic transverse cross-section view taken along line 21-21 of FIG. 17.

FIG. 22 is a schematic transverse cross-section view taken along line 22-22 of FIG. 20.

DETAILED DESCRIPTION

Figure 1:
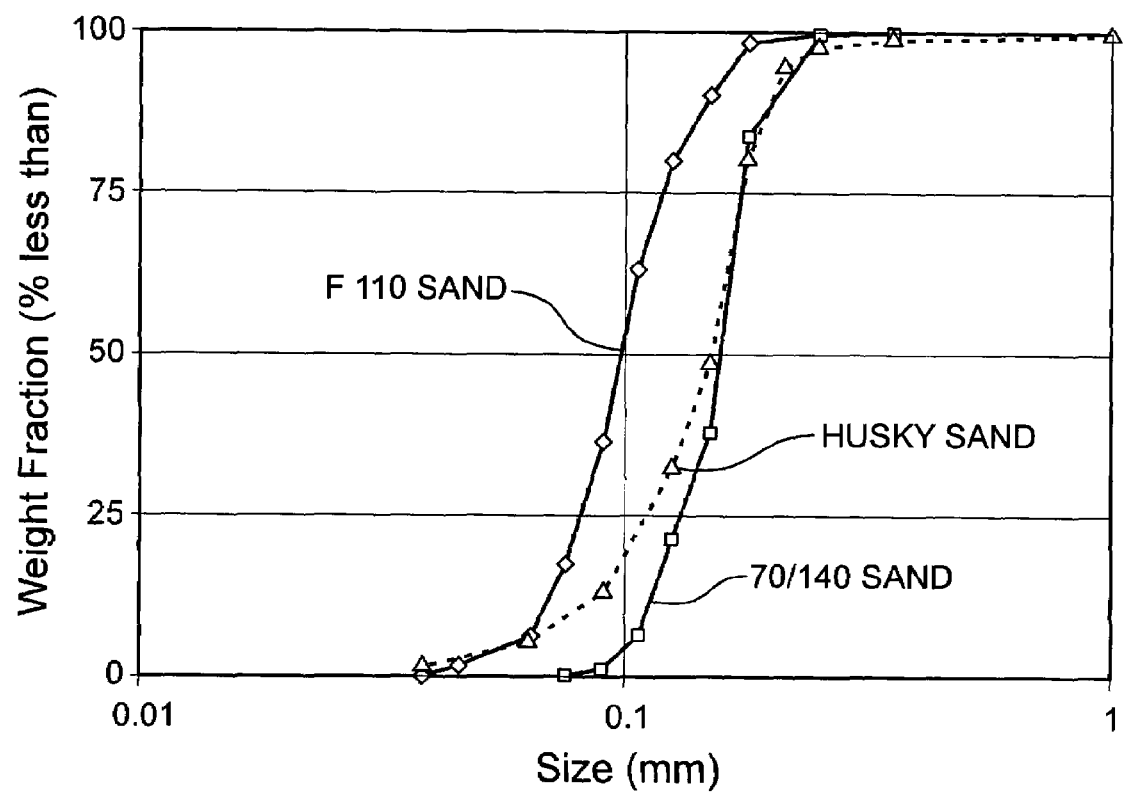
FIG. 1 is a graph depicting the grain size distribution for different sands used as reinforcing agents in testing of the invention.

The gel treatment method of the present invention is described in detail with reference to both a laboratory study and a field application of the invention. The laboratory study provides guidance for optimizing the composition of reinforced gels for use in the method of the invention. The field application provides an example of how the invention has been applied to a particular wellbore for the purpose of controlling and/or blocking water influx into the wellbore from wormholes communicating with the wellbore.

The laboratory study involved an investigation of the properties of different reinforced gels and a water shut-off experiment to evaluate the strength of a particular reinforced gel. The field application involved the injection of both an unreinforced gel and a reinforced gel into a wellbore in accordance with the method of the invention. The reinforced gels were comprised of an amount of a reinforcing material. The reinforcing material was provided to enhance or reinforce the network structure of the reinforced gel plug resulting from the reinforced gel.

As discussed above, any solid material may potentially be used as the reinforcing material within the scope of the invention. For instance, an inert filler such as a crushed or naturally fine rock material or glass beads may be used as the reinforcing material. In preferred embodiments of the invention as exemplified by the laboratory study and the field application the reinforcing material is comprised of sand.

It has been found generally that the strength of a reinforced gel plug resulting from a reinforced gel, and particularly a measurement of its yield stress, corresponds with the concentration of the reinforcing material contained therein. In other words, an increased sand concentration typically results in improved strength characteristics of the resulting reinforced gel plug. However, an increase in the concentration of the reinforcing material also increases the viscosity of the reinforced gel. Increased viscosity of the reinforced gel requires increased injection pressures into the wellbore. Accordingly, the concentration of reinforcing material should be selected to achieve a balance between the viscosity of the reinforced gel (thus permitting the reinforced gel to be injected effectively) and the strength of the resulting reinforced gel plug in the wormhole.

The unreinforced gel and the reinforced gel are both preferably comprised of substances which have a controllable rate of "setting" or gelation to provide a desired working time and which are capable of gelling a desired amount or degree in the wormhole in order to provide gel plugs having suitable properties. In addition, preferably the materials comprising both the unreinforced gel and the reinforced gel are selected to be compatible with the downhole conditions or environment of the wellbore and the high permeability channels.

Further, following addition of the reinforcing material, the reinforced gel preferably exhibits sufficient injectivity so that the reinforced gel is capable of being injected into the wormhole and properly placed at the desired site downhole and preferably also exhibits a suitable strength of the resulting reinforced gel plug.

The unreinforced gel and the reinforced gel are both preferably comprised of polymers and cross-linking agents to provide cross-linked polymers in the resulting unreinforced gel plug and the reinforced gel plug respectively. Preferably the viscosity of the gels during injection of the gels is such that the gels are injectable but are also capable of displacing the water in the wormholes without significantly mixing with the water in the wormholes.

It has been found that polymer gels tend to be easier to inject than clay gels and are typically not affected by salinity. As a result, in both the laboratory study and the field application, both the unreinforced gels and the reinforced gels were comprised of a polymer and a cross-linking agent.

Examples of various polymer gels are described in U.S. Pat. No. 4,683,949 issued Aug. 4, 1987 to Sydansk et. al. and U.S. Pat. No. 5,849,674 issued Dec. 15, 1998 to Fox et. al.

In previous screening tests, it has appeared that sandy polyacrylamide gels showed promise as wormhole blocking agents (Wiwchar, B., Cameron, S., Tremblay, B., McCarthy, C., Zhou, Z. J., "Produced Sand Reinforced Polymer Gel: Application for Water Shut-Off in Cold Production," Alberta Research Council, AACI Report #0001-5, June 2000).

As a result, the laboratory study was directed at the evaluation of different reinforced gel systems for use in the method of the invention, while the field application was directed at the performance of the method of the invention. In both the laboratory study and the field application the gels were comprised of solutions of a polyacrylamide gelling agent and a cross-linking agent. In both the laboratory study and the field application the reinforced gels were further comprised of sand as a reinforcing material.

Laboratory Study

The laboratory study was conducted to investigate different reinforced polymer gel systems for use in blocking high permeability channels such as wormholes. The overall objective of these systems was to combine relatively good injectivity of the reinforced gel with relatively high strength of the resulting reinforced gel plug. As discussed below, a series of viscosity, settling rate and gel strength tests were performed for different reinforcement concentrations, shear rates, polymer concentrations, molecular weight, molecular weight distribution, salinity and temperature. In addition, a water shut-off experiment was conducted using a particular reinforced polymer gel. From the results of the laboratory study, recommendations and guidance may be developed for the selection of an optimum reinforced polymer gel for controlling the influx of water into high permeability channels, including water shut-off applications in wormholes of cold production wells.

In the laboratory study, two different polyacrylamide gels (MARCIT$^{SM}$ and MARA-SEAL$^{SM}$) in combination with three different types of sand (F110 sand, 70/140 sand and produced sand) were used to prepare different reinforced polyacrylamide gels. MARCIT$^{SM}$ and MARA-SEAL$^{SM}$ are service marks of Marathon Oil Corporation referring to particular solutions comprising polyacrylamide gelling agents and cross-linking agents.

In order to choose the best or preferred gel in terms of gel placement and strength, the following properties of reinforced polymer gels were measured in the laboratory study: 1) viscosity as a function of shear rate, temperature, reinforcing material concentration and salinity; 2) yield stress; and 3) reinforcing material settling rate.

The results of the measurements of these properties suggest that one preferred reinforced gel may be comprised of a mixture of 60 weight % F110 sand and/or produced sand in a 7 weight % MARA-SEAL$^{SM}$ gel solution prepared using either fresh water or brine.

The water shut-off experiment was designed to simulate the blocking of a 10 cm diameter open channel portion of a wormhole in order to test the strength of a particular reinforced gel, which particular reinforced gel was intended to be exemplary and not necessarily an optimum or preferred reinforced gel for use in the invention.

Materials and Procedure

The sieve analyses of three different sands: F110 mesh sand (very fine—well sorted), 70/140 mesh sand (fine—well sorted) and produced sand (fine—poorly sorted), used in this study, are shown in FIG. 1. The produced sand was obtained from Husky Oil cold production surface collection tanks in the Lloydminster area (Canada).

MARCIT$^{SM}$ (also referred to as Hi-Vis 350) and MARA-SEAL$^{SM}$ gel solutions were used in this study. These polyacrylamide solutions have significantly different rheologies related to their molecular weight. The MARCIT$^{SM}$ polyacrylamide has a significantly higher molecular weight than the MARA-SEAL$^{SM}$ polyacrylamide.

The gel solutions were prepared at a concentration of 1.2 weight % for the MARCIT$^{SM}$ gel and 7 to 9 weight % for the MARA-SEAL$^{SM}$ gel. The gel solutions for both were prepared in either fresh water or brine solutions of 5 weight % NaCl and 0.25 weight % $CaCl_2$. Chromium Acetate ($CrAc_3$) was used as the crosslinking agent. Cross-linker concentrations of 0.2642 weight % and 0.32 weight % were used for the MARCIT$^{SM}$ gel and the MARA-SEAL$^{SM}$ gel respectively. Both types of gel solutions were prepared with fresh water unless mentioned otherwise. The materials were mixed and the samples were prepared according to methods known in the art. Further description of the mixing procedure and sample preparation techniques used in the laboratory study are, however, provided in: Tremblay, B., Wiwchar, B., Huang, H., Bani, E., Cameron, S. and Polikar, M., "Development and Testing of a Sandy Polyacrylamide Gel for Water Shut-off of Large Channels," Alberta Research Council, AACI Report 0102-2, January 2002.

The polyacrylamide gelling agents were dissolved in the water by agitating the mixture in a beaker using a magnetic stirrer. As well, a procedure was developed in the laboratory study to maximize the dispersion of the sand in the resulting solution. Particularly, in the laboratory study it was observed that the best dispersion of the sand into the solution was obtained by adding the cross-linker in two steps. In the first step, only a quarter of the total cross-linker was added to and manually mixed with the solution to form a weak gel. The weak gel was then added to a Sigma blade mixer and the sand was slowly added to ensure proper mixing. After 15 minutes, a uniform reinforced gel was obtained. The rest of the cross-linker was added at that time.

It was found during the laboratory study that if the sand is added in the mixer to polyacrylamide solution before cross-linking, the sand may tend to settle out and thus not be effectively dispersed throughout the solution. On the other hand, if the sand is added to a fully cross-linked gel, the sand may tend not to mix well in the solution leaving blobs of polyacrylamide gel without sand. The procedure as described above for addition of the cross-linker may assist in minimizing both of these effects, but may not be necessary in all cases.

Rheological measurements (viscosity, yield stress, elastic and shear modulus) pertaining to various unreinforced polyacrylamide gels and various reinforced polyacrylamide gels were performed in a shear rheometer (Haake™ RT-20) using a concentric cylinder geometry with a gap size of 3.15 mm. All sampling and measurements were performed at room temperature unless stated otherwise.

Figure 2:
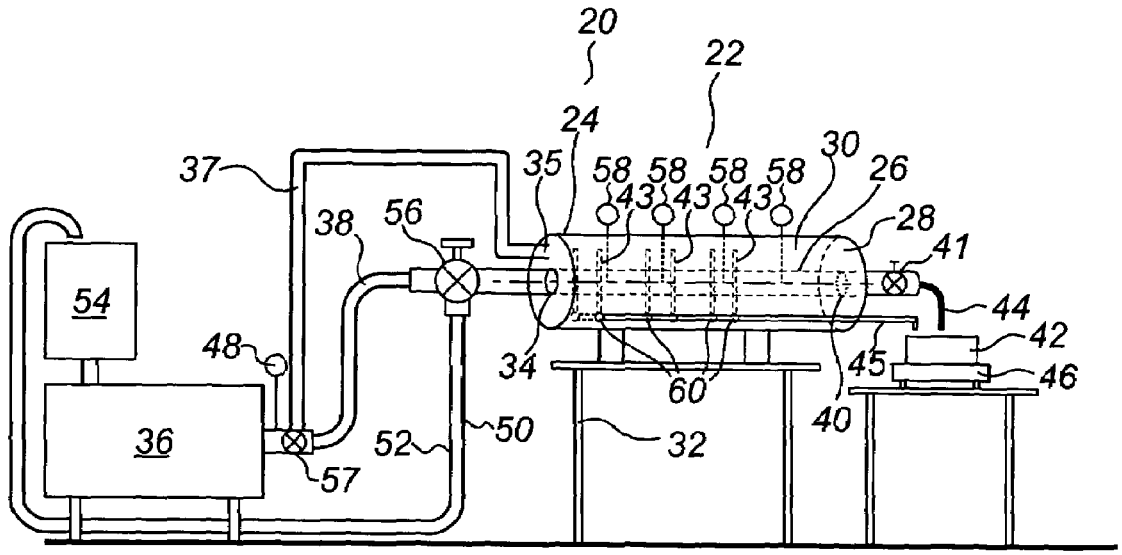
FIG. 2 is a schematic representation of a laboratory test apparatus used in a laboratory study of the invention.

The apparatus used to conduct the water shut-off experiment is depicted schematically in FIG. 2.

Results and Discussion

1. Gel Placement

When a reinforced gel reaches the bottom of the wellbore it must be able to carry the reinforcing material through casing perforations without bridging or screening out. Therefore, the settling rate of the reinforcing material should be moderate. The viscosity of the reinforced gel should also be moderate to facilitate effective injection.

Figure 3:
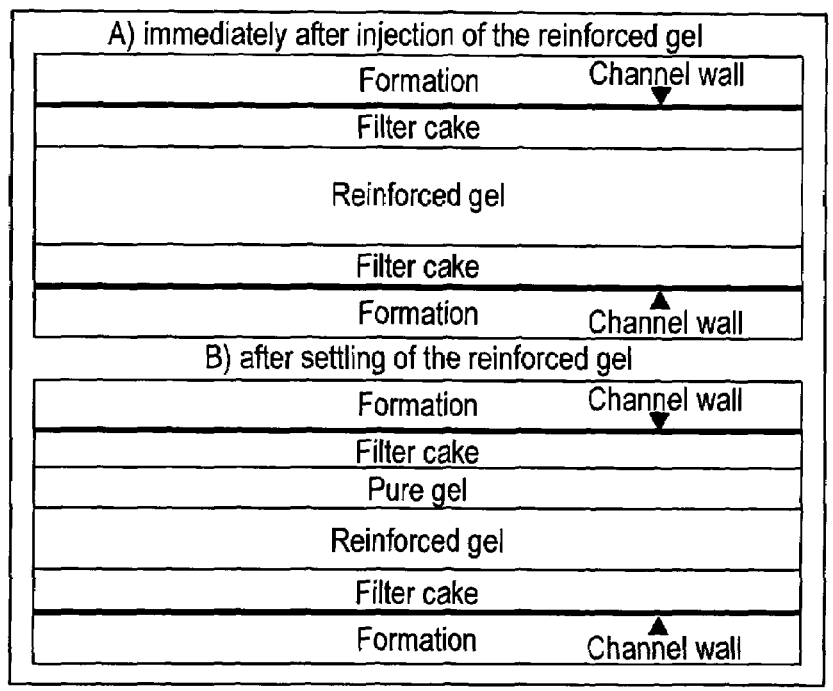
FIG. 3 is a schematic representation of a high permeability channel approximated by the laboratory test apparatus of FIG. 2 at different stages following injection of a reinforced gel through the laboratory test apparatus.

As described below, during the water shut-off experiment a filter cake was observed to be formed during placement of the reinforced gel. Numerical simulation of the caking process suggests that caking would occur in the field (Tremblay, B., Wiwchar, B., Huang, H., Bani, E., Cameron, S. and Polikar, M., "Development and Testing of a Sandy Polyacrylamide Gel for Water Shut-off of Large Channels," Alberta Research Council, AACI Report 0102-2, January 2002). For example, within a high permeability channel the reinforcing material in a reinforced gel may settle, leaving a layer of unreinforced gel as shown schematically in FIG. 3. The thickness of this layer of unreinforced gel is of major importance, since this layer is weaker and could more easily yield than the reinforced gel adjacent to the layer.

Figure 4:
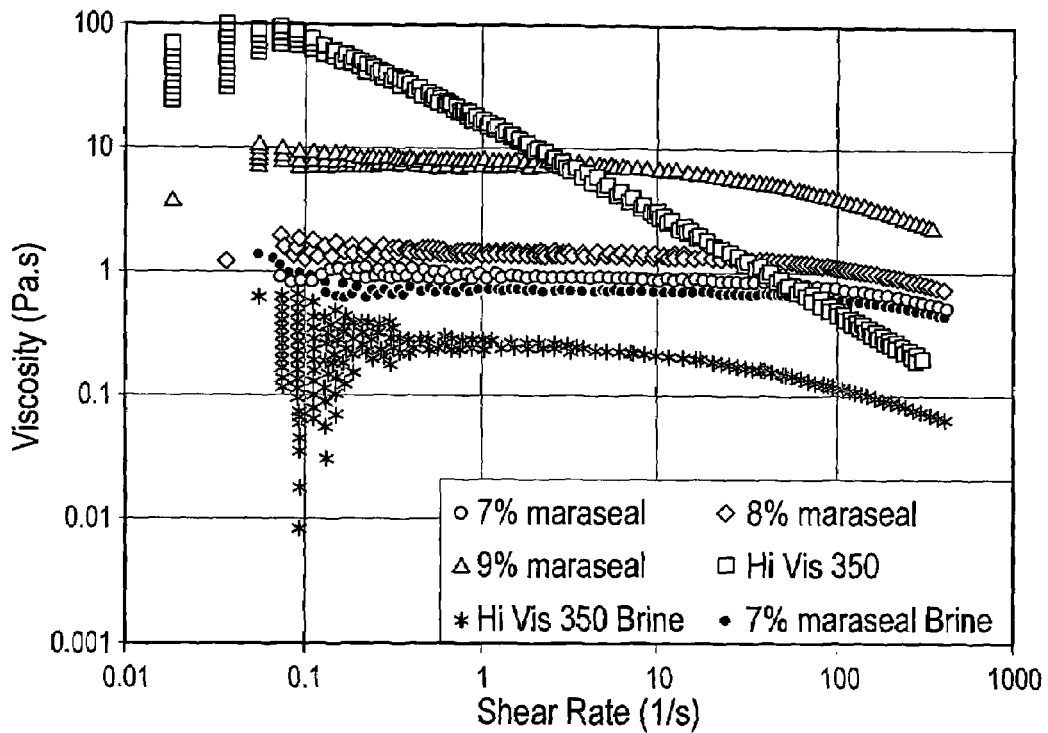
FIG. 4 is a graph depicting viscosity as a function of shear rate for various polyacrylamide gels.

Reinforced gel placement was investigated through a series of settling tests, using sands of different grain size distribution as the reinforcing material. The effect of the sand concentrations, salinity and viscosity on the settling rate and on the final thickness of the settled layer was investigated. The viscosity of the reinforced polyacrylamide gels was measured for different sand concentrations. The relative viscosity, defined as the ratio of the viscosity of the reinforced gel to the viscosity of the gel without the reinforcing material, was calculated from these viscosity measurements to assist in the numerical simulation of treatments involving reinforced polyacrylamide gels.

a) Unreinforced Gel Rheology:

The viscosities of various unreinforced polyacrylamide gels are shown in FIG. 4. The MARCIT$^{SM}$ gel solution showed the most shear thinning due to its relatively higher molecular weight. This type of polymer gel is of interest from an injectivity point of view since it can more easily suspend the reinforcing material at lower shear rates (higher viscosity) during the flow of the reinforced gel through a high permeability channel.

As noted above, some gels were prepared using a brine solution. The use of brine had the most effect on the MARCIT$^{SM}$ gel. The MARCIT$^{SM}$ gel prepared in fresh water had a much higher viscosity at low shear rates than a similar polymer gel prepared in brine. As expected, the viscosity of the polymer gels increased with increased polyacrylamide concentration for the MARA-SEAL$^{SM}$ gel solutions.

In summary, the viscosity of MARA-SEAL$^{SM}$ gel appears to be relatively more consistent and stable than the viscosity of MARCIT$^{SM}$ gel over a range of shear rates, particularly where MARCIT$^{SM}$ gel is prepared in fresh water. On the other hand, MARCIT$^{SM}$ gel, particularly when prepared in fresh water, exhibits relatively high viscosity at low shear rates in comparison with MARA-SEAL$^{SM}$ gel, even where the MARA-SEAL$^{SM}$ gel is prepared at high polyacrylamide concentrations.

In the controlled rate mode used in the laboratory study, the shear strain, $\gamma$, is assigned an amplitude, $\gamma_o$, and a frequency, f, such that:

$$\gamma = \gamma_o \sin(2\pi f t) \quad (A-1)$$

The resulting shear stress, $\tau$, is measured with the stress amplitude, $\tau_0$, and phase angle, $\delta$, such that:

$$\tau = \tau_0 \sin(2\pi f t + \delta) \quad (A-2)$$

The elastic (or storage) modulus, G', and loss (or viscous) modulus, G", are given by:

$$G' = \tau_0/\gamma_o \cos(\delta) \quad (A-3)$$

$$G'' = \tau_0/\gamma_o \sin(\delta) \quad (A-4)$$

In the case of purely elastic material ($\delta = 0°$):

$$G' = \tau_0/\gamma_o \text{ and } G'' = 0$$

In the case of purely viscous material ($\delta = 90°$):

$$G' = 0 \text{ and } G'' = \tau_0/\gamma_o$$

Figure 5:
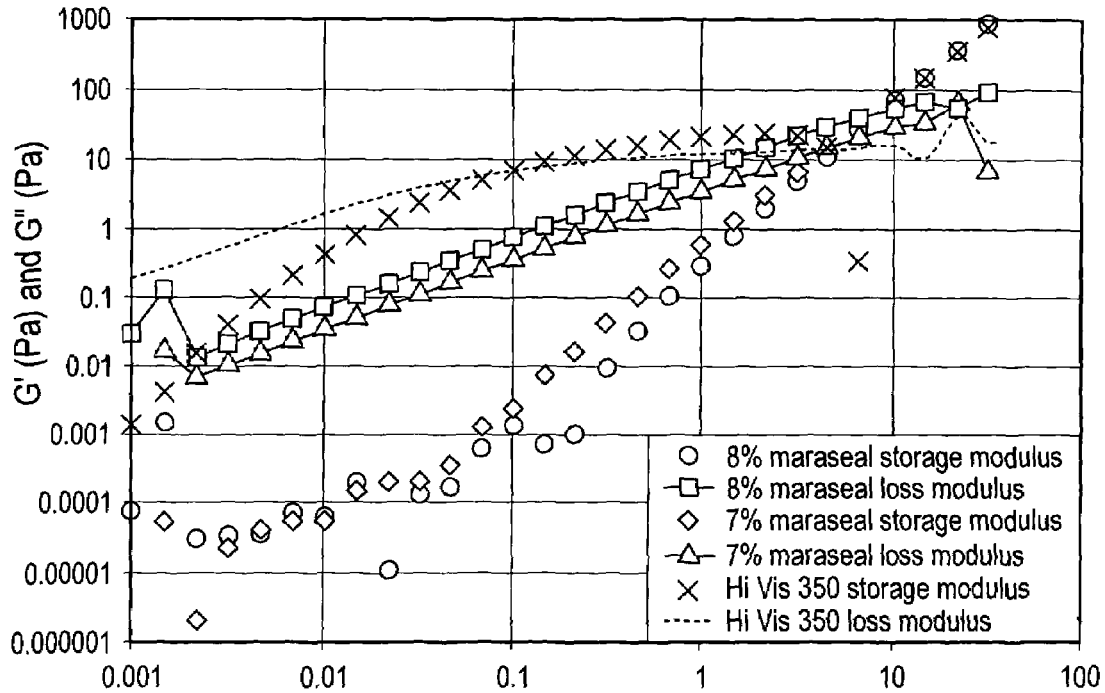
FIG. 5 is a graph depicting elastic modulus (G') and loss modulus (G") as a function of shear strain frequency for various polyacrylamide gels one hour after preparation.
Figure 6:
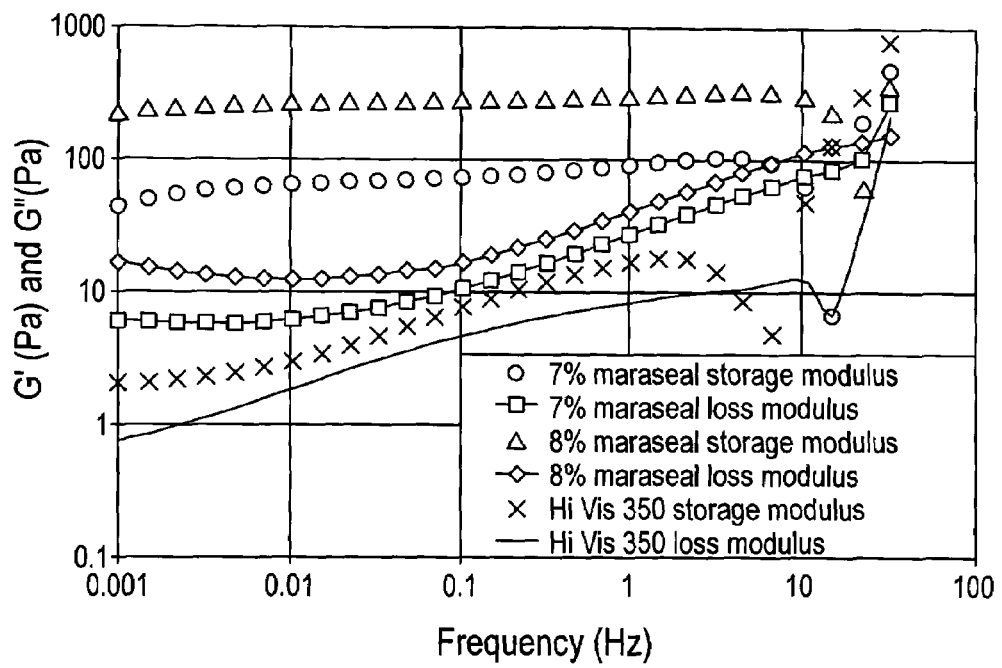
FIG. 6 is a graph depicting elastic modulus (G') and loss modulus (G") as a function of shear strain frequency for various polyacrylamide gels six days after preparation.

The elastic modulus (G') and loss modulus (G") were measured in the shear rheometer and are shown in FIG. 5 (shortly after gel preparation) and in FIG. 6 (6 days after gel preparation). The MARA-SEAL$^{SM}$ gel showed very little elasticity (low elastic modulus and phase angle=90°) after preparation compared to the MARCIT$^{SM}$ gel. This trend was reversed after 6 days of gelation as shown in FIG. 6 where the MARA-SEAL$^{SM}$ gel shows the higher G' and G".

In summary, after gelation the MARA-SEAL$^{SM}$ gel is relatively more rigid, whereas the MARCIT$^{SM}$ gel is relatively more deformable. This observation implies that the MARA-SEAL$^{SM}$ gel has greater mechanical strength following gelation than the MARCIT$^{SM}$ gel.

b) Settling Tests:

Two different quantities were measured in the settling tests: 1) the settling rate and 2) the final thickness of the sand-free layer at the top of the settling vessels. All settling tests were performed shortly after the reinforced gels were prepared. These settling tests were performed using mostly graduated cylinders of 100 cm$^3$ in volume. Some settling tests were performed using 500 cm$^3$ cylinders to confirm, as was observed in the experiments, that the cylinder diameter was not affecting the rate of settling. The slurries were prepared at sand concentrations of 20, 30, 40, 50, 60, 65, 70 and 75 weight %. The settling rate was calculated by measuring the time required for the sand/gel interface to travel the distance between gradation marks on the graduated cylinder surface.

Figure 7:
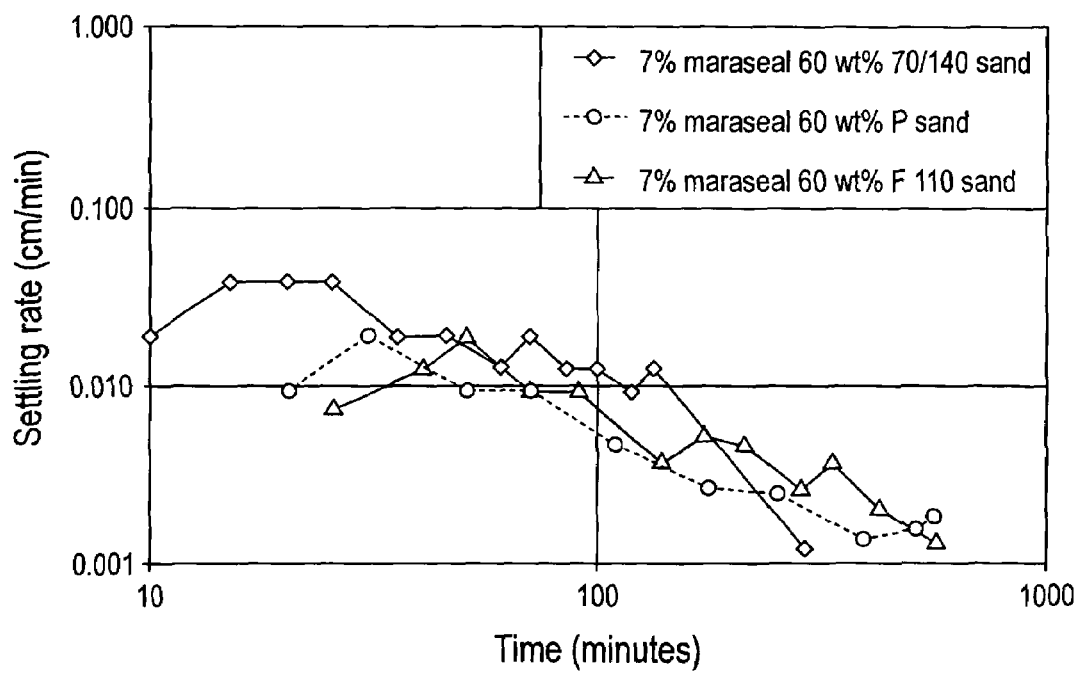
FIG. 7 is a graph depicting settling rate as a function of time for reinforced gels comprising 7% MARA-SEAL$^{SM}$ gel and 60 weight % sand as a reinforcing agent, for various sands.

The precise settling rate at which bridging would occur at casing perforations was not calculated. However, an idea of the maximum settling rate at which bridging would occur can be inferred from observations of bridging in the laboratory study. Sand bridging at the inlets to ball valves in small diameter tubes was observed when a reinforced MARA-SEAL$^{SM}$ gel, prepared using 60 weight % 70/140 sand, was injected through narrow tubing (4 mm inside diameter). No bridging was observed during the flow of a reinforced gel prepared with F110 sand through the same tubing and ball valves.

i) Reinforcing Material Grain Size Distribution Effect:

The settling rate measurements for the three sands, at a concentration of 60 weight % sand, in 7 weight % reinforced MARA-SEAL$^{SM}$ gel, are shown in FIG. 7. The reinforced gel prepared with the 70/140 sand settled the fastest. The reinforced gels prepared with the F110 sand and the produced sand settled at about the same rate. As observed in FIG. 1, the 70/140 sand was better sorted (narrower size distribution) than the produced sand, even though the D50 diameters of the two sands were almost the same. The lower settling rate of the produced sand is likely due to the hindrance effect of the fine grains which settle more slowly. This hindrance effect of the finer grains could also explain why the F110 sand settled almost at the same rate as the produced sand although their D50 diameters were not the same.

Figure 8:
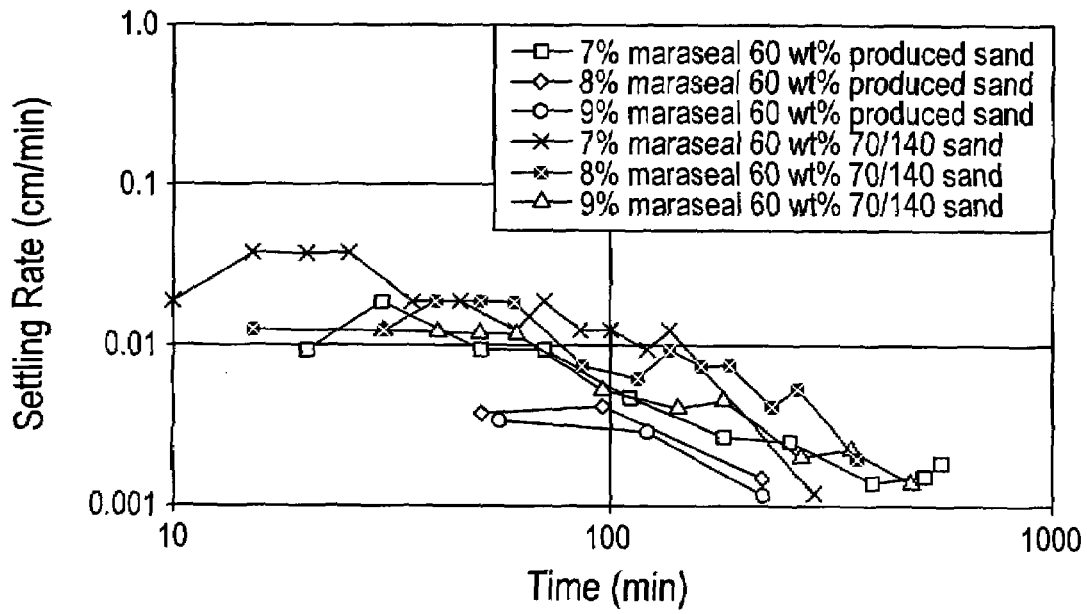
FIG. 8 is a graph depicting settling rate as a function of time for reinforced gels comprising various concentrations of MARA-SEAL$^{SM}$ gel and 60 weight % of various sands.

The results of these measurements suggest that reinforcing materials which are relatively fine or which have a relatively wide particle size distribution are likely to exhibit lower settling rates than reinforcing materials which are relatively coarse or which have a relatively narrow particle size distribution.

ii) Rheological Effects:

The settling rate of a 60 weight % produced sand and also of a 70/140 sand in reinforced MARA-SEAL$^{SM}$ gels of three different viscosities (polyacrylamide concentrations) is shown in FIG. 8. As expected, the settling rate was inversely proportional to the viscosity of the MARA-SEAL$^{SM}$ gels. The settling tests were performed immediately after the gels were prepared. Referring to FIG. 5, in this time period the MARA-SEAL$^{SM}$ gels behaved as purely viscous fluids since the phase angle measured in the oscillatory shear measurements discussed previously was approximately 90°. The yield stress of the unreinforced gels was measured in the shear rheometer in shear stress sweep measurements. Very low yield stress values were measured (between 0.7 to 0.85 Pa for all polyacrylamide concentrations), which is within experimental error.

The F110 sand is approximately twice the cost of a 70/140 sand. The F110 sand is also more difficult to obtain on a commercial scale than 70/140 sand since it is not a standard commercial product. In order to match the settling rate of the produced sand in a 7 weight % MARA-SEAL$^{SM}$ gel, the 70/140 sand would have to be prepared in a 9 weight % MARA-SEAL$^{SM}$ gel. This latter gel is more difficult to inject due to the relatively higher polyacrylamide content and resulting higher viscosity.

Figure 9:
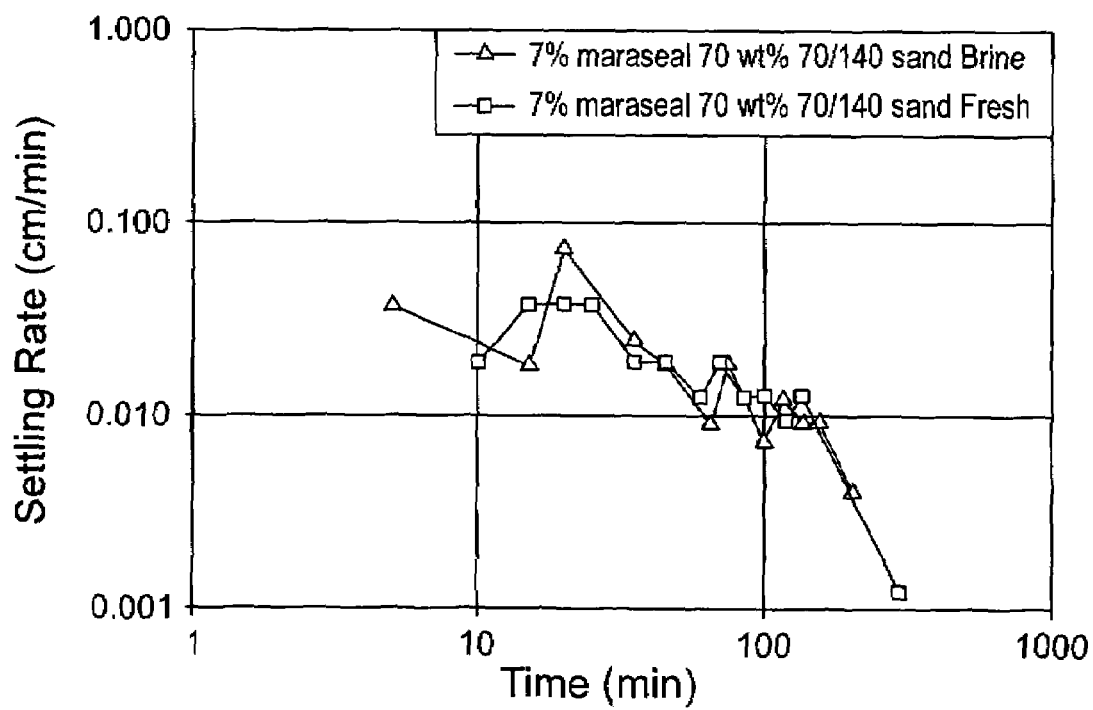
FIG. 9 is a graph depicting settling rate as a function of time for reinforced gels comprising 7% MARA-SEAL$^{SM}$ gel and 70 weight % 70/140 sand in fresh water and in brine.

These observations suggest that produced sand may be a preferred reinforcing material in reinforced gels for use in the invention, due to the cost and availability of F110 sand and the relatively high settling rates exhibited by 70/140 sand.

iii) Salinity Effect:

Settling tests indicated that salinity does not have significant effect for MARA-SEAL$^{SM}$ gel on the ultimate settling rates of the sand as shown in FIG. 9 for 7 weight % reinforced MARA-SEAL$^{SM}$ gel.

For MARCIT$^{SM}$ gel, salinity effectively reduces the viscosity of the gel resulting in a higher reinforcement settling rates as compared to MARCIT$^{SM}$ gels prepared with fresh water. These results were somewhat expected from the higher viscosity and elastic modulus of MARCIT$^{SM}$ gel prepared in fresh water in comparison with MARCIT$^{SM}$ gel prepared in brine (FIGS. 4 and 5).

Gheissary et. al. observed that elastic forces resulted in reduced settling velocity for the particles settling (Gheissary, G. and Van den Brule, B. H. A. A., "Unexpected phenomena observed in particle settling in non-Newtonian media," Journal of Non-Newtonian Fluid Mechanics, 67, Jan. 18, 1996).

Figure 10:
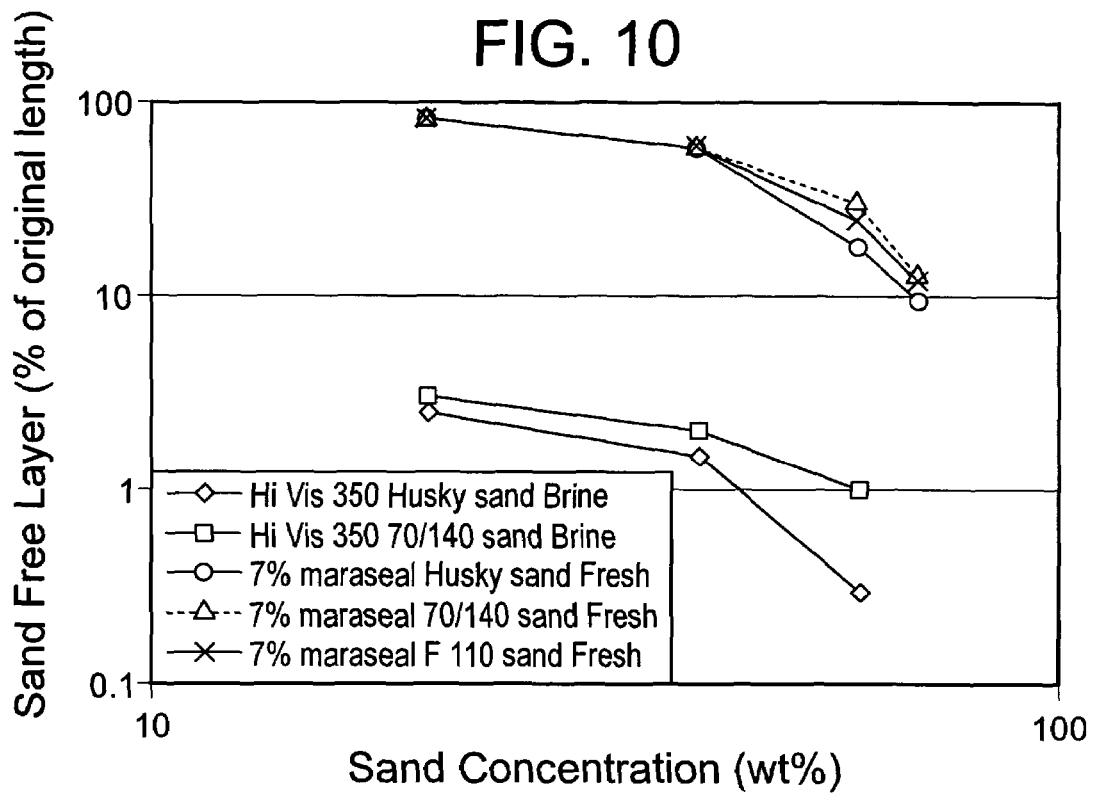
FIG. 10 is a graph depicting sand free layer as % of original height as a function of sand concentration for reinforced gels comprising various polyacrylamide gels and various sands.

In addition to settling rates, the final thickness of the settled layer is important in determining the strength of the reinforced gel plug in the field. FIG. 10 shows the height of the reinforcing material free layer (i.e., the ratio of reinforcing material-free layer at the top of the vessel to the initial height of the reinforced gel in the vessel) for different sands and polyacrylamide concentrations. These measurements show that the reinforcing material-free layer decreases in thickness with increasing reinforcing material concentration, probably due to hindrance effects on the settling rates which in turn reduce the amount of settling.

For MARA-SEAL$^{SM}$ gels, the final settled layer thickness was slightly lower with produced sand as the reinforcing material in 7 weight % reinforced MARA-SEAL$^{SM}$ gel in comparison with 7 weight % reinforced MARA-SEAL$^{SM}$ gel with 70/140 sand or F110 sand as the reinforcing material. The thickness was almost the same for the 70/140 and F110 sands in 7 weight % reinforced MARA-SEAL$^{SM}$ gels.

For MARCIT$^{SM}$ gels prepared in brine, the final settled layer thickness with both produced sand and 70/140 sand as the reinforcing material is many times smaller than the final settled layer thicknesses observed with the MARA-SEAL$^{SM}$ gels.

Although not shown in FIG. 10, settling was not observed for reinforced MARCIT$^{SM}$ gels prepared using fresh water at higher sand concentrations. Some settling of the sands was observed for reinforced MARCIT$^{SM}$ gels prepared using fresh water at relatively low sand concentrations.

Figure 11:
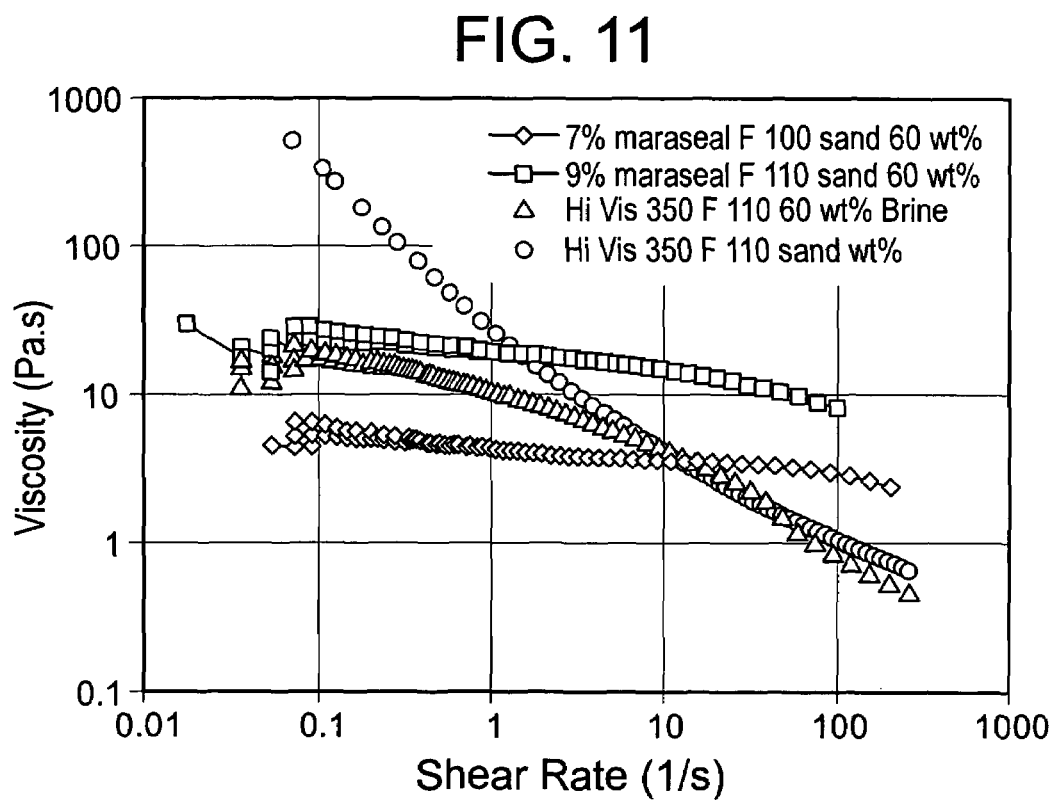
FIG. 11 is a graph depicting viscosity as a function of shear rate for reinforced gels comprising various polyacrylamide gels and 60 weight % F110 sand.

In summary, the MARCIT$^{SM}$ gels exhibited better reinforcing material suspension and injectivity characteristics for reinforced gels prepared in both fresh water and brine than did MARA-SEAL$^{SM}$ gels prepared in fresh water and brine. However, as discussed below the reinforced MARA-SEAL$^{SM}$ gels exhibit greater strength than the MARCIT$^{SM}$ gels.

c) Viscosity:

The Haake™ RT-20, which is a controlled rate/stress rheometer, was used to measure the rheological properties of reinforced MARCIT$^{SM}$ gels and reinforced MARA-SEAL$^{SM}$ gels, as shown in FIG. 11. The reinforced MARCIT$^{SM}$ gels (also referred to as Hi Vis 350) showed the most shear thinning, reflecting the shear thinning behaviour of unreinforced MARCIT$^{SM}$ gels.

d) Relative Viscosity:

Relative viscosity is defined as the ratio of the viscosity of a reinforced gel to the viscosity of a comparable unreinforced gel. For Newtonian fluids, relative viscosity does not depend on the viscosity of the suspending fluid. Therefore, relative viscosity can be used to estimate the viscosity of slurries prepared with different (Newtonian) fluids.

Figure 12:
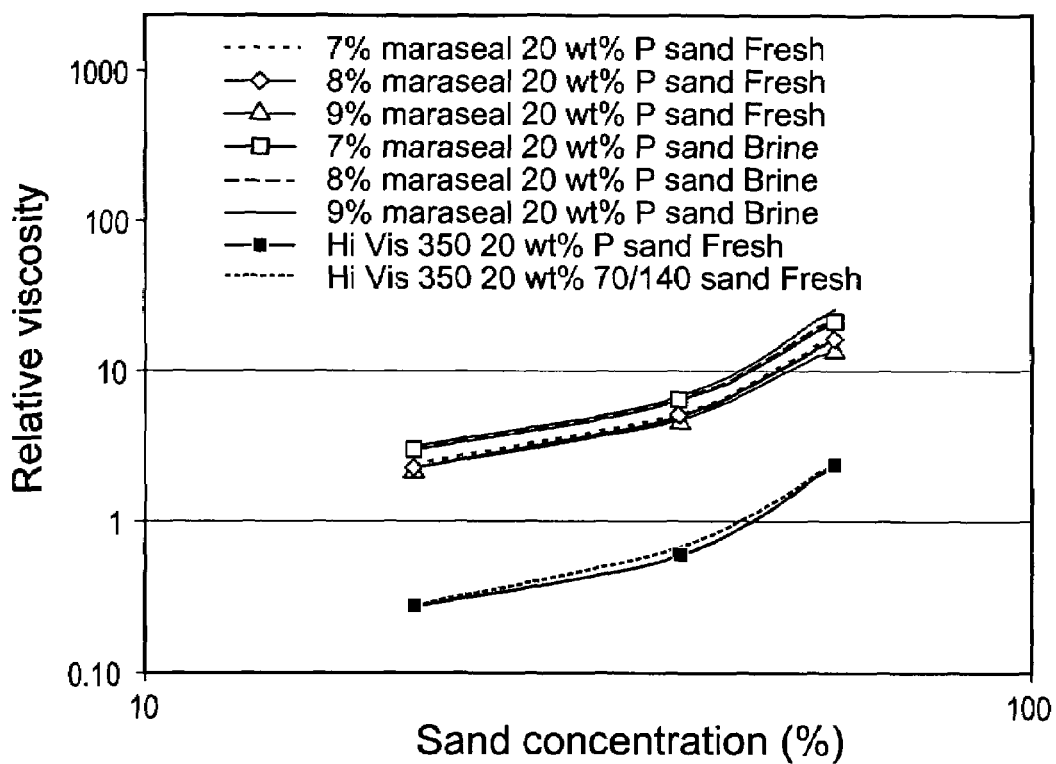
FIG. 12 is a graph depicting relative viscosity as a function of sand concentration for various polyacrylamide gels and various sands in fresh water and in brine.

For reinforced MARCIT$^{SM}$ gels and reinforced MARA-SEAL$^{SM}$ gels, relative viscosity was dependent on the shear rate since the corresponding unreinforced gels were shear-thinning (i.e., non-Newtonian fluids). The relative viscosities of various reinforced MARCIT$^{SM}$ gels and reinforced MARA-SEAL$^{SM}$ gels are shown in FIG. 12. Based upon FIG. 12, the relative viscosities for the same types of polyacrylamide gel appear to show little dependence upon the gel viscosity and on the salinity of the solution.

Surprisingly, the relative viscosity of the reinforced MARCIT$^{SM}$ gels was generally lower than 1 and seemed to be parallel to the curves for the reinforced MARA-SEAL$^{SM}$ gels. These results further support the suggestion that reinforced MARCIT$^{SM}$ gels could exhibit better injectivity characteristics than MARA-SEAL$^{SM}$ gels, even where the viscosity of the unreinforced MARCIT$^{SM}$ gels is greater than the viscosity of the unreinforced MARA-SEAL$^{SM}$ gels.

More measurements of the relative viscosities of reinforced gels prepared in gel solutions of different concentrations are needed before a more general relative viscosity curve can be obtained that could be used in the numerical simulation of gel placement treatments.

2. Gel Strength

One of the most important factors in the success of a gel treatment is of course the strength of the resulting gel plug A series of strength tests and a water shut-off experiment were performed to estimate the strength in the field of gel plugs resulting from reinforced polyacrylamide gels.

a) Gel Strength Tests:

Visual tests were conducted to evaluate the time the reinforced gels would take to reach the maximum attainable gel strength. The gel strength was estimated following the UNOCAL method described in Dovan et. al. (Dovan, H. T., Hutchins, R. D. and Sandiford, B. B., "Delaying Gelation of Aqueous Polymer at Elevated Temperatures Using Novel Organic Crosslinkers," paper SPE 37246, presented at the SPE International Symposium on Oilfield Chemistry, Houston, Tex., USA, 18-21 February, 1997), and as set out in Table 1.

TABLE 1

| Scale (UNOCAL Code) | Equivalence |
| --- | --- |
| 1+ | 1 |
| 2 | 2 |
| 3− | 3 |
| 3+ | 4 |
| 4+ | 5 |
| 5− | 6 |
| 5 | 7 |
| 5+ | 8 |
| 5++ | 9 |
| 6 | 10 |

Figure 13:
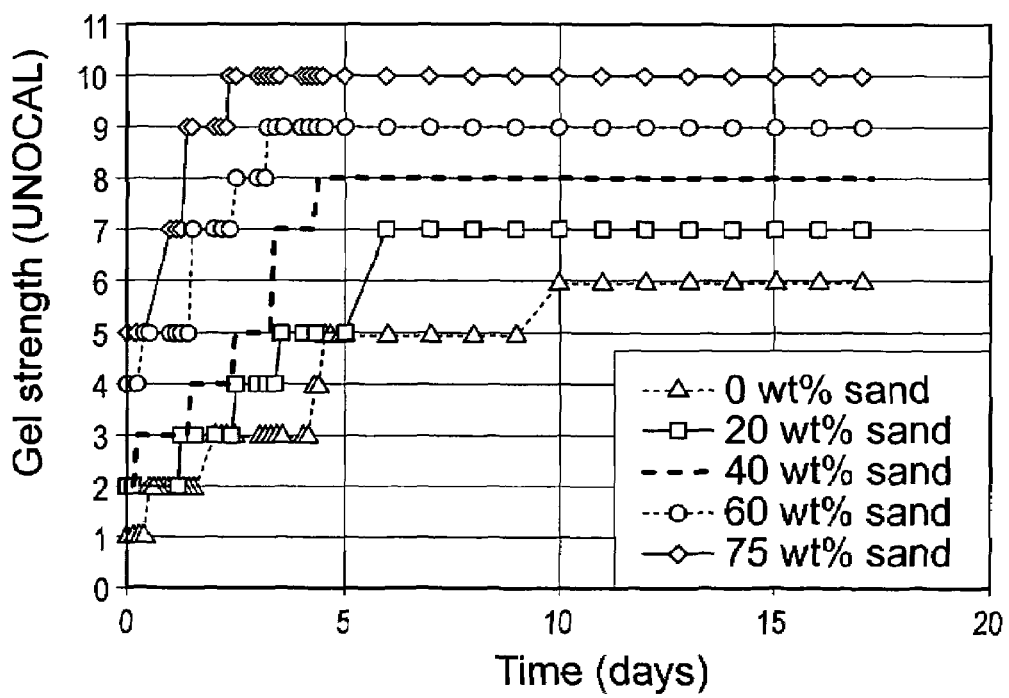
FIG. 13 is a graph depicting gel strength as a function of time for reinforced gels comprising MARCIT$^{SM}$ gel and different weight % of F110 sand.

As would be expected, the addition of reinforcing materials to MARCIT$^{SM}$ gels results in a significant increase in gel strength as shown in FIG. 13.

Although not shown in FIG. 13, all reinforced MARA-SEAL$^{SM}$ gels reached their maximum strength in between 4 and 5 days while reinforced MARCIT$^{SM}$ gels reached their maximum strength in more than 6 days.

Although also not shown in FIG. 13, reinforced MARA-SEAL$^{SM}$ gels appeared to have more physical strength on the UNOCAL scale than did reinforced MARCIT$^{SM}$ gels.

b) Yield Stress:

Yield stress of selected reinforced MARCIT$^{SM}$ gels and reinforced MARA-SEAL$^{SM}$ gels were measured using a shear vane. Reinforced MARCIT$^{SM}$ gels and reinforced MARA-SEAL$^{SM}$ gels both displayed relatively low yield stress after preparation.

Figure 14:
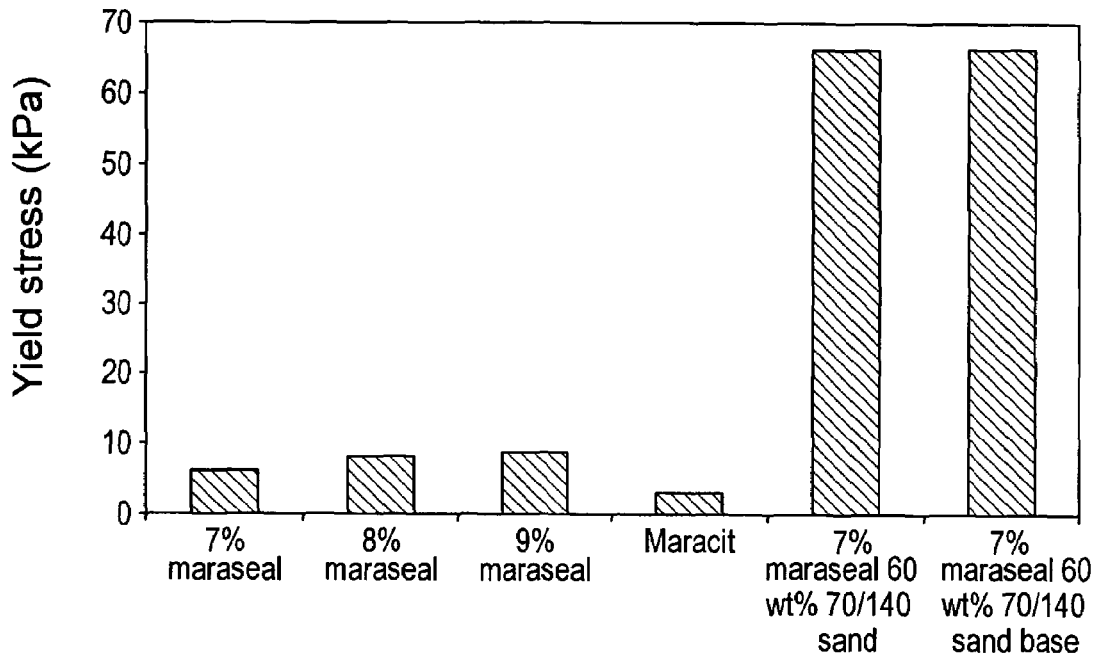
FIG. 14 is a bar graph depicting yield stress for unreinforced gels and reinforced gels comprising different polyacrylamide gels.

Yield stress measurements, conducted after 7 days of gelation time on one unreinforced MARCIT$^{SM}$ gel, three unreinforced MARA-SEAL$^{SM}$ gels, and two reinforced MARA-SEAL$^{SM}$ gels (60 weight % 70/140 sand) are shown in FIG. 14. The two reinforced MARA-SEAL$^{SM}$ gels were identical, but were tested under two separate conditions, as described below.

The unreinforced MARCIT$^{SM}$ gel exhibited the lowest yield stress followed by the 7 weight % unreinforced MARA-SEAL$^{SM}$ gel. The 8 weight % unreinforced MARA-SEAL$^{SM}$ gel and the 9 weight % unreinforced MARA-SEAL$^{SM}$ gel exhibited almost the same yield stresses. The reinforced MARA-SEAL$^{SM}$ gels exhibited the highest yield stresses in comparison with all of the unreinforced polyacrylamide gels.

The effect of salinity on the strength of a reinforced MARA-SEAL$^{SM}$ gel, prepared using fresh water, was tested by first preparing a 7 weight % MARA-SEAL$^{SM}$ gel in fresh water and adding 60 weight % 70/140 sand. The reinforced gel was then poured into two different beakers, representing the two test results reported in FIG. 14. The top half of one beaker was filled with brine while the top half of the other beaker was filed with fresh water. After 7 days, the yield stress was measured by inserting the shear vane into the reinforced MARA-SEAL$^{SM}$ gels and measuring the shear stress at which the reinforced MARA-SEAL$^{SM}$ gels yielded. As shown in FIG. 14, the yield stress of the reinforced MARA-SEAL$^{SM}$ gel from the brine filled beaker was not significantly affected by the salinity of the water above it.

Based upon FIG. 14, it appears that an unreinforced MARA-SEAL$^{SM}$ gel will likely exhibit greater strength after 7 days of gelation than will an unreinforced MARCIT$^{SM}$ gel. It also appears from FIG. 14 that a reinforced MARA-SEAL$^{SM}$ gel will exhibit a much higher yield stress following gelation than will an unreinforced MARA-SEAL$^{SM}$ gel. Finally, it appears from FIG. 14 that the presence of salinity during gelation will not significantly affect the yield stress of a reinforced MARA-SEAL$^{SM}$ gel.

3. Water Shut-Off Experiment

The objectives of the water shut-off experiment were: 1) to predict the strength following gelation of a particular reinforced gel plug in an open channel portion of a wormhole having a field-scale diameter (10 cm.), by simulating the wormhole in a laboratory apparatus; 2) to evaluate the injectivity of the particular reinforced gel; and 3) to evaluate the extent of reinforcing material compaction along the length of the simulated wormhole as gel "leaked-off" into the surrounding formation during the gel treatment.

A 60 weight % F110 sand in 1.2 weight % reinforced MARCIT$^{SM}$ gel was used as the reinforced gel in the water shut-off experiment. The reinforced gel was prepared by mixing the polyacrylamide in a 5 weight % brine solution.

At the time of the water shut-off experiment, it was thought that the salinity of the formation might influence the strength of the gel plug if the gel were prepared in fresh water. Therefore, it was desirable to know beforehand what the strength of the reinforced gel plug would be if produced with brine. The results of the yield strength testing described above and depicted in FIG. 14, however, suggest that the presence of salinity during gelation should not adversely affect the strength of a reinforced polyacrylamide gel prepared in fresh water.

Referring to FIG. 2, the apparatus (20) used for conducting the water shut-off experiment is depicted. The apparatus (20) included a pipe assembly (22) comprising an outer flanged pipe (24) and a concentric inner screened pipe (26). The inner diameter of the flanged pipe (24) was 20 centimeters. The inner diameter of the screened pipe (26) was 10 centimeters. The flanged pipe (24) and the screened pipe (26) were both 1.2 meters long. An annulus (28) was defined between the flanged pipe (24) and the screened pipe (26).

The screened pipe (26) simulated a high permeability channel, or more particularly, a wormhole consisting only of an open channel portion. The annulus (28) simulated the formation surrounding the wormhole. The screened pipe (26) included perforations around its circumference, except at the ends of the screened pipe (26), which facilitated leak-off of fluids from the screened pipe (26) to the annulus (28).

The annulus (28) was filled with a sand pack (30) which was prepared by vibrating the pipe assembly (22) in a vertical position and pluviating a 70-140 mesh (D50 of 0.16 mm) Ottawa sand obtained from Badger Mining Co. The resulting porosity of the sand pack (30) was about 35%.

The pipe assembly (22) was placed on a steel stand (32) such that its orientation angle could be changed. A screened pipe inlet (34) was connected to a progressive cavity pump (36) by a pipe injection line (38). A screened pipe outlet (40) was in communication with a collection vessel (42) by a pipe outlet line (44).

An annulus inlet (35) was connected to the progressive cavity pump (36) by an annulus injection line (37). A series of annulus drains (43) were positioned along the length of the annulus (28). An annulus outlet line (45) was connected with the annulus drains (43). The annulus outlet line (45) was in communication with the collection vessel (42).

The collection vessel (42) was positioned on an electronic scale (46).

During the water shut-off experiment, the reinforced gel was injected into the screened pipe (26) by the progressive cavity pump (36). A pump pressure transducer (48) was located downstream of the progressive cavity pump (36) to monitor the injection pressure to ensure that the injection pressure did not exceed a pre-selected maximum value of about 1.7 MPa.

A bypass loop (50) was provided for recirculating excess reinforced gel. The bypass loop (50) included a bypass line (52) and a funnel (54). The funnel (54) communicated with the progressive cavity pump (36).

A pipe injection line valve (56) was provided between the progressive cavity pump (36) and the pipe assembly (22) to facilitate control over injection into the screened pipe (26). An annulus injection line valve (57) was provided between the progressive cavity pump (36) and the pipe assembly (22) to facilitate control over injection into the annulus (28).

A series of pipe pressure transducers (58) were positioned along the screened pipe (26) to monitor the pressure along the length of the screened pipe (26). Annulus drain valves (60) associated with the annulus drains (43) were provided in order to facilitate either draining or sealing of the annulus (28).

The water shut-off experiment involving the reinforced gel included the following steps and observations:

i. The pipe assembly (22) was oriented in a vertical direction and water was injected into the screened pipe (26) in order to fill the screened pipe (26) and the annulus (28) with water, thus simulating formation water;

ii. Reinforced gel slurry was injected into the screened pipe (26) for 38 minutes at about 620 cm$^3$/min (0.0372 m$^3$/h) using the progressive cavity pump (36) at 50% of its maximum speed;

iii. During the first 35.5 minutes, only water (9550 g in total) was produced out of the screened pipe (26). The volume of the produced water was approximately the same as the volume (10 liters) of the screened pipe (26), suggesting that the water was uniformly displaced by the reinforced polymer gel. The reinforced polymer gel started to be produced afterwards. The injection was stopped after a period of 38 minutes. A total of 5259 g of reinforced polymer gel was produced out of the screened pipe (26);

iv. The screened pipe (26) was shut-in by closing the screened pipe outlet valve (41), and the annulus drain valves (60) were opened;

v. Additional reinforced polymer gel was injected into the screened pipe (26) using the progressive cavity pump (36) at 25% of its maximum speed;

vi. After 5866 g of water was squeezed out of the sand pack (30), the progressive cavity pump (36) could no longer inject any additional reinforced polymer gel without continuously reaching the pre-selected maximum injection pressure. At this point, the pipe injection line valve (56) and the annulus drain valves (60) were closed;

vii. In order to prevent bypass of water through the annulus (28) when performing the strength test, the annulus injection line valve (57) was opened, unreinforced polymer gel was injected into the annulus (28) via the annulus inlet (35), and was produced at the annulus outlet line (45);

viii. The pipe assembly (22) was shut-in by closing the annulus injection line valve (57) and the compacted reinforced polymer gel was allowed to cross-link to its maximum strength over a period of 6 days;

ix. The ends of the screened pipe (26), not containing perforations, were excavated and filled with water;

x. The pressure at the screened pipe outlet (40) was increased in steps with the pipe assembly (22) oriented horizontally; and xi. Water was collected from the screened pipe inlet (34) at atmospheric pressure, as an indicator of displacement of the reinforced polymer gel or of water breakthrough.

Figure 15:
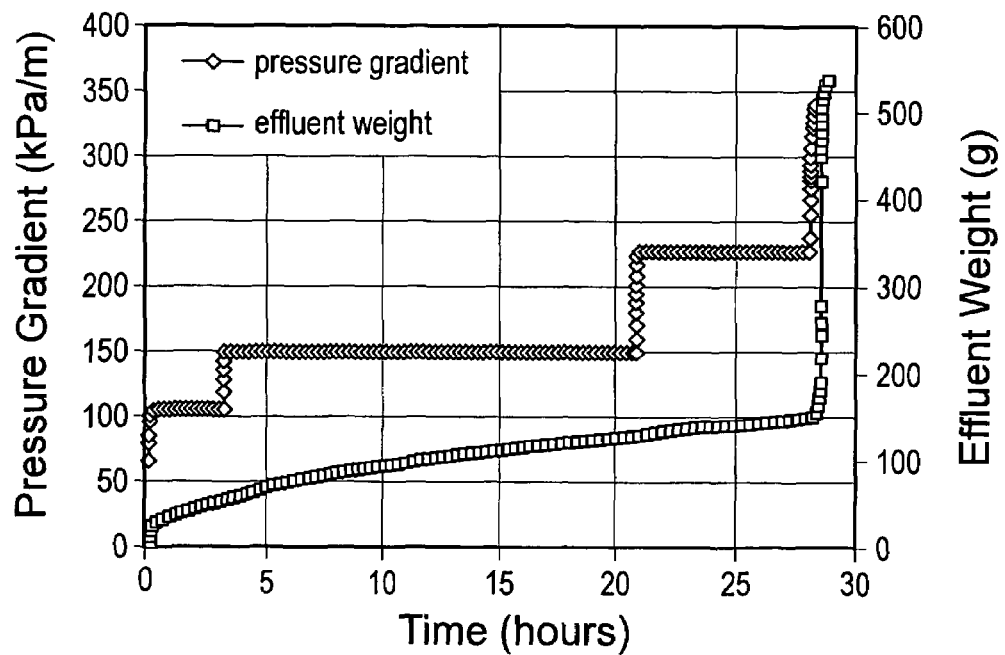
FIG. 15 is a graph depicting pressure gradient and effluent weight as a function of time following gelation for seven days of a reinforced MARCIT$^{SM}$ gel in the laboratory test apparatus depicted in FIG. 2.

The weight of produced water and the pressure gradient (difference in pressure between the screened pipe outlet (40) and the screened pipe inlet (34)/length of the screened pipe (26)) as a function of time are shown in FIG. 15. Water breakthrough occurred at a pressure gradient of between 230 kPa/m and 340 kPa/m. A shear strength of 9 kPa was calculated at the wall of the screened pipe (26) using the following equation:

$$\tau = (R/2)(\Delta P/L)$$

where: $\tau$ is the shear stress, $\Delta P/L$ is the pressure gradient and R is the radius of the screened pipe (26).

On a field perspective, the reinforced MARCIT$^{SM}$ gel (prepared in brine) which was the subject of the water shut-off experiment could conceivably block an aquifer pressure of about 5 MPa over a length of 20 meters. Although this reinforced gel appears reasonably strong, its yield stress (9 kPa) is significantly lower than the yield stress (65 kPa) for the 60 weight % 70/140 sand in 7 weight % reinforced MARA-SEAL$^{SM}$ gel (prepared in fresh water), determined using the same apparatus, as shown in FIG. 14.

Figure 16:
FIG. 16 is a photograph of a longitudinal section of a reinforced gel plug removed from the laboratory test apparatus depicted in FIG. 2.

At the end of the water shut-off experiment, the screened pipe (26) was opened along its length and the reinforced gel plug was removed. When the plug was sliced longitudinally, a thick filter cake of sand could be observed, as shown in FIG. 16. The measured porosity of the filter cake was quite low (38%), indicating that the sand was well compacted.

Conclusions from Laboratory Study

In summary, the following conclusions may be drawn from the laboratory study:

1. Addition of reinforcing materials to unreinforced polyacrylamide gels increases the final strength of the resulting reinforced gel plugs.
2. Reinforcing materials with relatively broader particle size distribution exhibit a relatively lower degree of settling and result in reinforced gel plugs having a relatively higher yield stress in comparison with reinforcing materials which are relatively well sorted.
3. Reinforced MARCIT$^{SM}$ gel prepared with fresh water provides the lowest settling rate and final reinforcing material-free layer thickness of the polyacrylamide gels evaluated in the laboratory study.
4. From the water shut-off experiment, a reinforced gel plug capable of resisting approximately 225 to 340 kPa/m was demonstrated to be possible to form within a high permeability channel. On a field perspective, such a reinforced gel plug could conceivably block an aquifer pressure of about 5 MPa over a length of about 20 meters.
5. Reinforced gels prepared using unreinforced MARA-SEAL$^{SM}$ gels in combination with either an F110 sand or a produced sand should be stronger than the reinforced MARCIT$^{SM}$ gel which was evaluated in the water shut-off experiment, based on the yield stress testing depicted in FIG. 14.

More particularly, the results of the laboratory study may be utilized to develop a method of controlling water influx into wellbores through high permeability channels, such as through wormholes during cold production of heavy oil.

For example, the method used in the water shut-off experiment involves injecting a reinforced polyacrylamide gel into a high permeability channel. In the water shut-off experiment, it was found that leak-off of gel into the surrounding formation would lead to caking at the walls of the channel. This leak-off of gel from the screened pipe (26) into the surrounding annulus (28) increased the sand concentration inside the screened pipe (26) to more than about 80 weight % of the reinforced gel. It is believed as a result of the laboratory study that this caking phenomenon effectively strengthens the reinforced gel plug.

Field Application of Invention

The results from the laboratory study were used to design and implement a preferred embodiment of a method of field application of the invention, involving the blocking of wormholes in a cold production well.

Referring to FIGS. 17-22, the sequence of a preferred embodiment of the method is depicted. FIGS. 17-22 are schematic drawings and are not drawn to scale.

In the Figures, a wellbore (80) is located within a formation (82) containing heavy oil. The wellbore (80) may be open but is preferably provided with a perforated casing (84).

A wormhole (86) extends from the wellbore (80) and through the formation (82). The diameter of the wormhole (86) may range from one or more centimeters to more than one meter. The length of the wormhole (86) may be several meters to several hundred meters.

The wormhole (86) results from the production of sand from the wellbore (80), which creates a void or voids in the formation (82). The wormhole (86) typically includes both an open channel portion (88) and a loose material portion (90). The open channel portion (88) contains a formation fluid (92), but no solid material or relatively small amounts of solid material. The loose material portion (90) contains residual sand which has not yet been produced from the wellbore (80) via the wormhole (86). The loose material portion (90) is uncompacted or loosely compacted and has a relatively high porosity and permeability in comparison with the formation (82). Formation fluid (92) is contained in the pores of the loose material portion (90).

The method is preferably used for the treatment of wormholes which are directly or indirectly in communication with a source of underground water such as an aquifer and have thus experienced significant water influx or water breakthrough, with the result that the wormholes are producing significant amounts of water at the wellbore (80). As a result, as depicted in FIGS. 17-22, the formation fluid (92) comprises a relatively high proportion of water.

FIG. 21 depicts a transverse cross-section of the wormhole (86) as it may appear prior to gel treatment using the method of the invention. In FIG. 21, the open channel portion (88) of the wormhole (86) essentially contains formation fluid (92), while the loose material portion (90) of the wormhole (86) essentially contains relatively uncompacted sand with formation fluid (92) saturating its pores.

Figure 17:
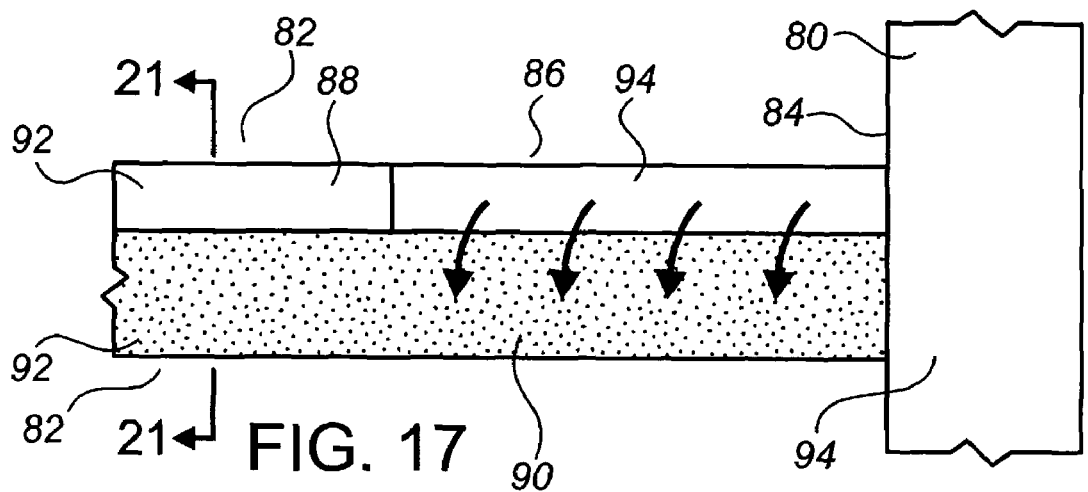

FIG. 17 depicts the wormhole (86) immediately following the step of introducing an unreinforced gel (94) into the wormhole (86). The unreinforced gel (94) primarily enters the open channel portion (88) of the wormhole (86) and displaces the formation fluid (92) in the open channel portion (88). As a result of the pressure which is required to introduce the unreinforced gel (94) into the wormhole (86), an amount of the unreinforced gel (94) will "leak off" from the open channel portion (88) into the loose material portion (90) of the wormhole (86), thus displacing some of the formation fluid (92) which is present in the pores of the loose material portion (90).

Figure 18:
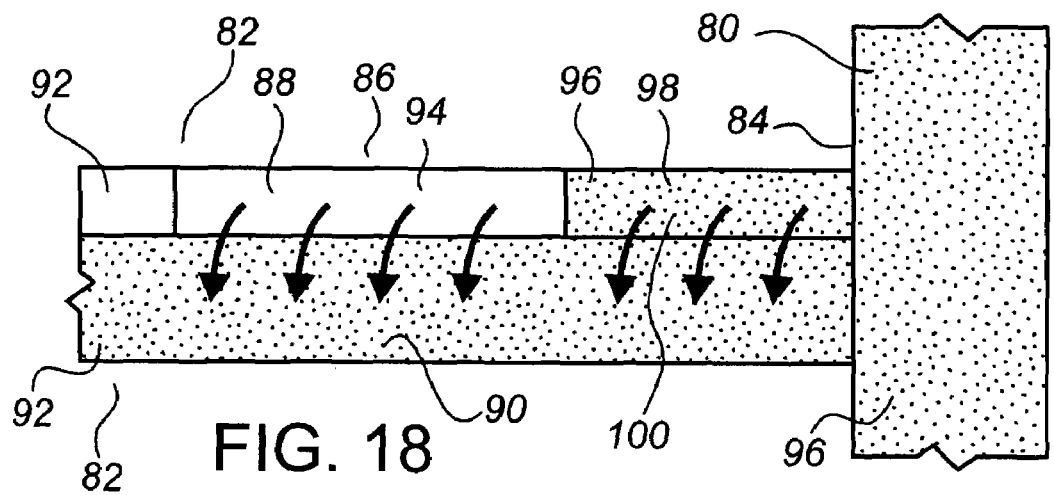

FIG. 18 depicts the wormhole (86) immediately following the step of introducing a reinforced gel (96) into the wormhole (86). The reinforced gel (96) primarily enters the open channel portion (88) of the wormhole (86). The reinforced gel (96) comprises a gel portion (98) and a reinforcing material portion (100). The reinforcing material portion (100) is suspended within the gel portion (98) when the reinforced gel is introduced into the wormhole (86).

As a result of the introduction of the reinforced gel (96) into the open channel portion (88) of the wormhole (86), the unreinforced gel (94) forms a slug in the wormhole (86) which serves as a barrier between the formation fluid (92) and the reinforced gel (96). This slug prevents dilution and contamination of the reinforced gel (96) by the formation fluid (92). The reinforced gel (34) displaces the slug of the unreinforced gel (94) and further displaces the formation fluid (92) in the open channel portion (88) of the wormhole (86).

As a result of the pressure which is required to introduce the reinforced gel (96) into the wormhole (86), an amount of the gel portion (98) of the reinforced gel (96) will "leak off" from the open channel portion (88) into the loose material portion (90) of the wormhole (86), thus displacing more of the formation fluid (92) which is present in the pores of the loose material portion (90). The reinforcing material portion (100) of the reinforced gel (96) will remain in the open channel portion (88) of the wormhole (86), constrained by the formation (82) and by the filter effect of the loose material portion (90) of the wormhole (86). The pressure exerted on the slug of unreinforced gel (94) during introduction of the reinforced gel (96) will also cause further leak off of the unreinforced gel (94) from the open channel portion (88) into the loose material portion (90) of the wormhole (86).

Figure 19:
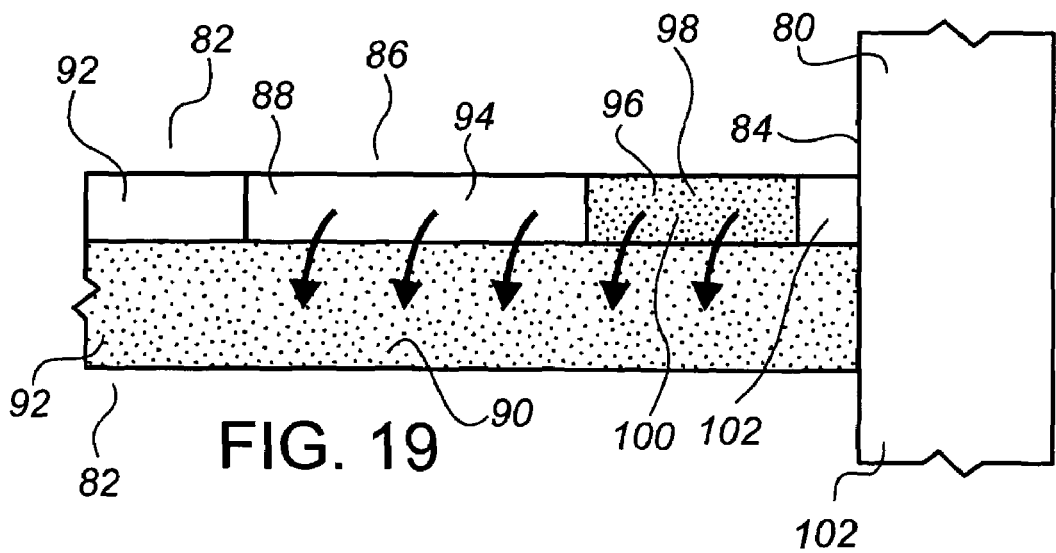

FIG. 19 depicts the wormhole (86) immediately following the step of introducing a chaser fluid (102) into the wellbore (80) and into the wormhole (86). The chaser fluid (102) primarily enters the open channel portion (88) of the wormhole (86). As a result of the introduction of the chaser fluid (102) into the wormhole (86) the reinforced gel (96) forms a slug which is bounded on one side by the slug of the unreinforced gel (94) and which is bounded on the other side by the chaser fluid (102). The chaser fluid (102) serves to move the reinforced gel (96) away from the wellbore (80) and further into the wormhole (86) so that the reinforced gel (96) does not interfere with the wellbore (80).

As a result of the pressure which is required to introduce the chaser fluid (102) into the wellbore (80) and into the wormhole (86), further leak off is caused of both the unreinforced gel (94) and the gel portion (98) of the reinforced gel (96) from the open channel portion (88) into the loose material portion (90) of the wormhole (86).

FIG. 20 depicts the wormhole (86) after the wormhole (86) has had an opportunity to stabilize, partly through further leak off of the unreinforced gel (94) and the gel portion (98) of the reinforced gel (96), and after the unreinforced gel (94) and the reinforced gel (96) have had an opportunity to gelate.

Depending upon the gel or gels used in the gel treatment and upon the characteristics of the wellbore (80), this stabilization and gelation may involve the step of shutting in the wellbore (80) for a period of time following the step of introducing the chaser fluid (102) into the wellbore (80). For example, where the unreinforced gel (94) and the reinforced gel (96) are comprised of a polymer gel such as polyacrylamide, the wellbore (80) may preferably be shut in for several days to several weeks.

FIG. 22 depicts a transverse cross-section of the wormhole (86) in the region of the slug of reinforced gel (96) as the wormhole (86) may appear following the stabilization of the wormhole (86) and the gelation of the unreinforced gel (94) and the reinforced gel (96).

In FIG. 22, the open channel portion (88) of the wormhole (86) contains a gelated reinforced gel plug (104). As a result of the leak off of some of the gel portion (98) of the reinforced gel (96) during the performance of the method, the reinforcing material portion (100) will constitute a higher proportion in the gelated reinforced gel plug (104) than it does in the reinforced gel (96). For example, if the reinforcing material portion (100) represents about 60 percent by weight of the reinforced gel (96), then the reinforcing material portion (100) may represent as much or more than about 80 percent by weight of the gelated reinforced gel plug (104).

In FIG. 22, the loose material portion (90) of the wormhole (86) contains a gelated loose material plug (106) which comprises the loose material in the loose material portion (90) and unreinforced gel (94) and gel portion (98) from the reinforced gel (96) is present in the pores of the loose material portion (90) due to leak off from the open channel portion (88). The gelated loose material plug (106) will contain a relatively high proportion of loose material, due to the loose material which was in the loose material portion (90) of the wormhole (86) prior to the performance of the method.

The combined effect of the presence of the gelated reinforced gel plug (104) and the gelated loose material plug (106) in the wormhole (86) is that a reinforced plug material fills all or substantially all of the cross-section of the wormhole (86). Furthermore, the reinforced plug material in both portions (28,30) of the wormhole (86) contains a relatively large proportion of reinforcing material (100) so that the mechanical properties of the plugs (44,46) are well suited for blocking the passage of water through the wormhole (86).

As can be seen, the step of introducing the unreinforced gel (94) into the wormhole (86) in advance of the reinforced gel

(96) performs two functions. First, the unreinforced gel (94) forms a slug in the wormhole (86) which provides a barrier or a buffer between the formation fluid (92) and the reinforced gel (96). Second, the unreinforced gel (94) provides a secondary source of gel for "leak off" into the loose material portion (90) to supplement the gel portion (98) of the reinforced gel (96) which is available for leak off. This secondary source of gel ensures that the loose material portion (90) of the wormhole (86) is adequately blocked during the performance of the method.

The design parameters for the actual field test of the invention in a wellbore are described in Example 1 below.

Example 1

The wellbore was cased with a casing (177.8 mm, 25.3 kg/m, H-40) from surface (kelly bushing) to a depth of 627 meters, with perforations extending through a depth of between 527 meters and 530 meters. A packer was set at 544 meters from surface. The casing volume was calculated to be approximately 11.5 m$^3$. The bottom hole static temperature (BHST) was estimated to be 26° Celsius. The wellbore did not contain tubing. The wellbore had an assumed fracture gradient of 21 kPa/meter.

The wellbore had experienced water breakthrough and it was believed that the water breakthrough was via one or more wormholes extending from the wellbore. A gel treatment procedure according to the invention was proposed for the wellbore, with the goal of returning the wellbore to normal production.

The selected gel for both the unreinforced gel and the reinforced gel was MARA-SEAL$^{SM}$ gel. The gel treatment consisted of the steps of introducing an unreinforced gel into the wellbore, introducing a reinforced gel into the wellbore, and introducing a chaser fluid into the wellbore.

The unreinforced MARA-SEAL$^{SM}$ gel consisted of 15,000 liters of a solution containing 3.0% J491 gelling agent (polyacrylamide) (31.6 kg/m$^3$) and 0.35% J492 cross-linker (chromium acetate) (3.5 liters/m$^3$).

The reinforced MARA-SEAL$^{SM}$ gel consisted of 4500 liters of a solution containing 7.0% J491 gelling agent (polyacrylamide) (73.7 kg/m$^3$) and 1.72% J492 cross-linker (chromium acetate) (17.21 liters/m$^3$) combined with 1500 kg/m$^3$ fine sand (6750 kg total amount). The 4500 liter gel solution produced approximately 7000 liters of the reinforced gel after the sand was added.

The 6750 kg of sand used in the reinforced gel was a mixture of 4550 kg of F110 sand and 2200 kg of 100 mesh sand.

The chaser fluid was produced water. The maximum amount of chaser fluid to be introduced into the wellbore was tentatively calculated to be 8700 liters based upon the casing volume and the anticipated fluid level in the wellbore. The actual maximum amount of chaser fluid to be used will in practice be variable depending upon the actual fluid level in the wellbore, as measured at the wellsite prior to performance of the gel treatment.

The gelling agent was hydrated in advance to provide both the 3.0% solution and the 7.0% solution before the gel treatment was performed. The cross-linker was added to the 3.0% gelling agent solution to produce the unreinforced gel at the wellsite before the gel treatment was performed. The sand, followed by the cross-linker, were added to the 7.0% gelling agent solution to produce the reinforced gel at the wellsite before the gel treatment was performed.

Prior to the performance of the gel treatment, suitable well equipment (cleaned to avoid contamination) was provided at the wellsite and the treating lines were pressure tested to a pressure of 21,000 kPa.

To ensure quality assurance and quality control, the viscosity of both the 3.0% gelling agent solution and the unreinforced gel (i.e., the 3.0% gelling agent after the addition of the cross-linker) were tested. Similarly, the viscosity of the 7.0% gelling agent solution (before the addition of the sand) was tested. Finally, the reinforced gel was visually observed (following the addition of the sand and the cross-linker to the 7.0% gelling agent solution) to ensure that the cross-linker had thoroughly dispersed through and had thoroughly mixed with the gelling agent.

As the first step of the gel treatment, the 15,000 liters of the unreinforced gel was prepared (by combining the hydrated polyacrylamide gelling agent solution and the cross-linker) and then pumped into the casing at a rate of about 0.5 m$^3$/minute.

As the second step of the gel treatment, the 7000 liters of the reinforced gel was prepared (by combining the hydrated polyacrylamide gelling agent solution, the sand and the cross-linker) and was pumped into the casing at a rate of about 0.5 m$^3$/minute.

As the third step of the method, the chaser fluid was pumped into the casing at a rate of about 0.5 m$^3$/minute until the reinforced MARA-SEAL$^{SM}$ gel arrived at the top perforation depth. Pumping of the chaser fluid was then continued at a rate of about 0.5 m$^3$/minute until the reinforced gel was overflushed into the perforations by a maximum of about 500 liters. Despite the above guidelines for the pumping of the chaser fluid, it should be noted that the maximum amount of produced water to be pumped into the casing was limited to 8700 liters, as described above.

Following the third step of the method, the wellbore was shut in, the rig equipment was removed and the wellhead equipment was installed. The wellbore remained shut in for approximately one week before production from the wellbore was resumed.

Conclusions from Laboratory Study and Field Application

The present invention is directed at a method for controlling water influx through high permeability channels. Specifically, the method includes the injection of an unreinforced gel (94) and a reinforced gel (96) into one or more high permeability channels to provide reinforced gel (96) plugs in the high permeability channels.

Preferably the high permeability channels are comprised of an open channel portion and a loose material portion. More preferably the high permeability channels are comprised of a wormhole (86), such as a wormhole (86) of the type which is typically created in a wellbore (80) during cold production processes.

It has been found that the use of the preferred method described herein tends to result in the preferential conducting of the reinforced gel (96) into watered-out high permeability channels instead of those containing heavy oil. Further, this preferential conducting of the reinforced gel is enhanced or facilitated by the relatively high viscosity of the heavy oil relative to the viscosity of formation water.

Based upon the above laboratory study and field application, the preferred method of the within invention includes injecting into a high permeability channel a number of solutions or substances, including the unreinforced gel (94) and the reinforced gel (96), in a preferred sequence. First, an amount of the unreinforced gel (94) is introduced into the high permeability channel. Second, an amount of the reinforced gel (96) is introduced into the high permeability channel. Finally, if desired, an amount of a chaser fluid (102) may be introduced into the high permeability channel.

The composition and amounts of the various solutions or substances which are injected into the high permeability channels may be optimized for a particular wellbore (80) and high permeability channel based upon the characteristics of the wellbore (80) and the high permeability channels and upon the strength requirements of the resulting gel plugs (104,106).

The following discussion provides some general guidelines for designing a gel treatment for a particular wellbore (80), but each wellbore (80) should be assessed on an individual basis having regard to the principles of the invention as discussed herein.

The unreinforced gel (94) is preferably comprised of a solution of a relatively low molecular weight chemical gelling agent and preferably has a gelling agent concentration of between about 2 and 5 weight %, more preferably about 3 weight %. However, alternately, a relatively higher molecular weight chemical gelling agent may be used and the unreinforced gel (94) may have a lower gelling agent concentration of between about 1 to 2 weight %. The chemical gelling agent is preferably comprised of a polymer, and more preferably, is comprised of a polyacrylamide.

Further, the unreinforced gel (94) preferably includes a mass ratio of cross-linker to polymer of between about 1:40 to 1:60, more preferably about 1:40. The addition of the cross-linker into the polymer solution is preferably delayed as long as possible prior to the injection of the unreinforced gel (94) in the well in order to delay gelation, and thus assist or facilitate the injection process. In other words, the cross-linker is preferably mixed with the polymer as near the time of injection as is reasonably practicable.

For a wellbore having a casing volume of about 11.5 m$^3$ a volume of the unreinforced gel (94) of about 15 m$^3$ is preferred, although depending upon the casing volume the volume of the unreinforced gel (94) may be in the range of about 15 m$^3$ to 50 m$^3$.

The reinforced gel (96) preferably contains a relatively high concentration of a reinforcing material (100), which reinforcing material (100) is preferably sand. The sand is preferably comprised of produced sand or preferably has a grain size of about F110 mesh, although finer or coarser sand may be utilized. The reinforced gel (96) preferably has a reinforcing material (100) concentration in a range of about 50-70 weight %, more preferably about 60 weight %.

The reinforced gel (96) is preferably comprised of a solution of a relatively low molecular weight chemical gelling agent and preferably has a gelling agent concentration of between about 5 to 9 weight %, more preferably about 7 weight %. However, alternately, a relatively higher molecular weight chemical gelling agent may be used and the reinforced gel (96) may have a lower gelling agent concentration of between about 1 to 2 weight %. As with the unreinforced gel (94), the reinforced gel (96) is preferably comprised of a polymer, and more preferably, is comprised of a polyacrylamide.

The reinforced gel (96) also preferably includes a mass ratio of cross-linker to polymer of between about 1:40 to 1:60, more preferably about 1:40. As with the unreinforced gel (94), the addition of the cross-linker into the polymer solution is again preferably delayed as long as possible prior to the injection of the reinforced gel (96) in the wellbore (80) in order to delay gelation, and thus assist or facilitate the injection process. In other words, the cross-linker is again preferably mixed with the polymer as near the time of injection as is reasonably practicable.

Finally, for a wellbore (80) having a casing volume of about 11.5 m$^3$ a volume of reinforced gel (96) of about 7.5 m$^3$ is preferred, although depending upon the casing volume the volume of the reinforced gel (96) may be in the range of about 5 m$^3$ to 12 m$^3$. However, reservoir considerations may support, and be in favor of, volumes larger than 12 m$^3$, and even volumes significantly larger than 12 m$^3$.

The chaser fluid (102) is preferably comprised of produced or formation water, which is typically comprised of brine having a concentration of between about 1-3 weight %. However, the chaser fluid (102) may alternately be comprised of a chemical gelling agent, preferably a relatively low cost chemical gelling agent.

The volume of the chaser fluid (102) is preferably sufficient to provide at least about 0.5 m$^3$ for overflushing of the reinforced gel (96) away from the wellbore (20). For a casing volume of about 11.5 m$^3$ an additional volume of chaser fluid (102) of between about 0-10 m$^3$ to displace the previous fluids (34,36) in the wellbore may be provided. Depending upon the casing volume and the location of the high permeability channels to be blocked, larger or smaller amounts of chaser fluid (102) may be used.

The purpose of injecting the materials in the described sequence is to preferably cause substantially the entire cross-sectional structure of the high permeability channels, such as wormholes (86), to be plugged. The unreinforced gel (94) will tend to be transported mainly through the open channel portion (88) of the wormhole (86), although some of it may penetrate into the surrounding loose material portion (90) of the wormhole (86). When the reinforced gel (96) is injected against the unreinforced gel (94) through the open channel portion (88) of the wormhole (26), some of the gel solution from the reinforced gel (96) and some of the unreinforced gel (94) will leak off into the loose material portion (90) of the wormhole (86). This will cause the reinforcing material (100) content of the reinforced gel (96) in the open channel portion (88) of the wormhole (86) to be increased, up to about 80 weight % or more, while saturating the surrounding loose material portion (90) with the gel portion (98) of the reinforced gel (96) and the unreinforced gel (94).

Consequently, after gelation of the unreinforced gel (94) and the reinforced gel (96), a relatively high strength plug of the reinforced gel (96) will tend to be formed in the open channel portion (88) of the wormhole (86) and the surrounding loose material portion (90) will tend to be plugged with gel which has leaked off from the unreinforced gel (94) and the reinforced gel (96). The chaser fluid (102) is preferably injected immediately after the reinforced gel (96) in order to push the reinforced gel (96) away from the wellbore (80) prior to its substantial gelation.

The preferred volumes of each of the materials is described above. However, generally, the volumes of each are selected so as to block the high permeability channels which are allowing water influx as much as possible, while limiting the blocking of oil flow in any high permeability channels which are not experiencing significant water breakthrough.

Following treatment, the treated well should preferably be shut in for a minimum period (such as several days to several weeks) to allow sufficient gelation of the unreinforced gel (94) and the reinforced gel (96).

The method of the invention has many potential applications.

In a first exemplary application, referred to as a "reactivation application", the treated well may be put back on production following the treatment. In a second exemplary application, referred to as a "sacrificial application", the treated well may be shut-in permanently following the treatment to protect offset wells from water encroachment.

In the case of a reactivation application or a sacrificial application, the selection of the well or wells to be treated and the decision as to whether to conduct a reactivation application or a sacrificial application may be made by evaluating the specific conditions existing in the reservoir of interest, including the potential sources of water encroachment.

For example, a reactivation application may be attractive in the following circumstances:

(a) where relatively low volumes of oil have been produced from the well to be treated (the required volume of treatment fluids for a well tends to increase with the volume of oil produced from the well, since oil production results in sand production and larger high permeability channels or wormholes (86)); and (b) where the water influx into the well to be treated is relatively localized so that water can effectively be pumped from the well, thus reducing the amount of treatment fluids which must be used to displace water in the wellbore.

On the other hand, a sacrificial application may be attractive where the well to be treated constitutes a link between high permeability channels associated with two or more other offset wells, with the result that treatment of the single well may be effective to improve production from the offset wells. Depending upon the number of offset wells which are "connected" by the well to be treated, a sacrificial application may be cost effective in circumstances where a reactivation application is not cost effective.

In a third exemplary application, referred to as a "completion application", the treated well may be put into production or back into production following the treatment, wherein the treatment is conducted for the purpose of blocking high permeability channels in the nature of gaps or voids located along the interface between the wellbore and the surrounding formation, particularly in cased wellbores.

In this third application, the unreinforced gel (94) and the reinforced gel (96) are introduced into the high permeability channels through casing perforations in order to fill the gaps or voids. In the third application, the step of introducing the chaser fluid is not performed. Instead, the casing is re-perforated following the treatment in order to reestablish communication between the treated well and the surrounding formation.

In a fourth exemplary application, referred to as a "multilateral application", the method of the invention may be performed in a well having a primary wellbore extending from the surface which divides into two or more lateral wellbores below the surface.

In this fourth application, the method of the invention may be used to selectively block one or more lateral wellbores which have become hydraulically connected with sources of water, following which the treated well may be put back into production. In the fourth application, the lateral wellbores are functionally representative of high permeability channels such as wormholes and may include both an open channel portion and a loose material portion. As a result, in the fourth application the method of the invention may be performed in a similar manner as described above in connection with the field application of the invention.

The embodiments of the invention in which an exclusive property or privilege is claimed are defined as follows:

1. A method of blocking a high permeability channel in communication with a wellbore, comprising:

(a) introducing an amount of an unreinforced gel into the high permeability channel via the wellbore; and (b) introducing an amount of a reinforced gel comprising an amount of a reinforcing material into the high permeability channel via the wellbore, wherein the reinforcing material is comprised of sand.

2. The method as claimed in claim 1 wherein the sand is substantially comprised of particles which have a particle size less than about 70 mesh.

3. The method as claimed in claim 2 wherein the amount of the sand is between about 50 weight % and about 70 weight % of the reinforced gel.

4. The method as claimed in claim 3 wherein the sand is substantially comprised of particles which have a particle size less than about 100 mesh.

5. The method as claimed in claim 2 wherein the sand is comprised of particles which have a relatively wide particle size distribution.

6. The method as claimed in claim 1 wherein the method comprises introducing the unreinforced gel and subsequently introducing the reinforced gel in sequence.

7. The method as claimed in claim 6 wherein the unreinforced gel is comprised of a chemical gel.

8. The method as claimed in claim 6 wherein the unreinforced gel is comprised of a polymer gel.

9. The method as claimed in claim 6 wherein the unreinforced gel is comprised of a polyacrylamide gel.

10. The method as claimed in claim 6 wherein the unreinforced gel is comprised of a polyacrylamide gelling agent and a cross-linker.

11. The method as claimed in claim 10, further comprising the step of preparing the unreinforced gel, wherein the unreinforced gel preparing step is comprised of the following steps:

(a) hydrating the gelling agent to form a gelling agent solution; and (b) adding a cross-linker to the gelling agent solution.

12. The method as claimed in claim 11 wherein the step of adding the cross-linker to the gelling agent solution is performed substantially immediately before performing the step of introducing the unreinforced gel into the high permeability channel.

13. The method as claimed in claim 10 wherein the unreinforced gel is comprised of a solution comprising between about 2 weight % and about 5 weight % of a relatively low molecular weight polyacrylamide gelling agent.

14. The method as claimed in claim 10 wherein the unreinforced gel is comprised of a solution comprising between about 1 weight % and about 2 weight % of a relatively high molecular weight polyacrylamide gelling agent.

15. The method as claimed in claim 6 wherein the reinforced gel is comprised of a chemical gel.

16. The method as claimed in claim 6 wherein the reinforced gel is comprised of a polymer gel.

17. The method as claimed in claim 16 wherein the reinforced gel is further comprised of an amount of clay.

18. The method as claimed in claim 17 wherein the amount of clay is a finite amount which is less than about 20 weight % of the reinforced gel.

19. The method as claimed in claim 17 wherein the amount of clay is a finite amount which is less than about 15 weight % of the reinforced gel.

20. The method as claimed in claim 6 wherein the reinforced gel is comprised of a polyacrylamide gel.

21. The method as claimed in claim 6 wherein the reinforced gel is comprised of a polyacrylamide gelling agent and a cross-linker.

22. The method as claimed in claim 21, further comprising the step of preparing the reinforced gel, wherein the reinforced gel preparing step is comprised of the following steps:
   (a) hydrating the gelling agent to form a gelling agent solution;
   (b) adding the reinforcing material to the gelling agent solution; and
   (c) adding a cross-linker to the gelling agent solution.

23. The method as claimed in claim 22 wherein the step of adding the cross-linker to the gelling agent solution is performed substantially immediately before performing the step of introducing the reinforced gel into the high permeability channel.

24. The method as claimed in claim 21 wherein the reinforced gel is comprised of a solution comprising between about 5 weight % and about 9 weight % of a relatively low molecular weight polyacrylamide gelling agent.

25. The method as claimed in claim 21 wherein the reinforced gel is comprised of a solution comprising between about 1 weight % and about 2 weight % of a relatively high molecular weight polyacrylamide gelling agent.

26. The method as claimed in claim 6 wherein the high permeability channel is comprised of an open channel portion and a loose material portion.

27. The method as claimed in claim 26 wherein the high permeability channel is comprised of a wormhole resulting from a cold production process.

28. The method as claimed in claim 6, further comprising the step, following the step of introducing the amount of the reinforced gel into the high permeability channel, of introducing an amount of a chaser fluid into the wellbore.

29. The method as claimed in claim 28, wherein the amount of the chaser fluid is sufficient to overflush the reinforced gel into the high permeability channel so that the reinforced gel does not interfere with the wellbore.

30. The method as claimed in claim 29 wherein the chaser fluid is comprised of produced water.

31. The method as claimed in claim 6, further comprising the step, following the step of introducing the amount of the reinforced gel into the high permeability channel, of shutting in the wellbore for a period of time in order to allow for gelation of the unreinforced gel and the reinforced gel.

32. The method as claimed in claim 6 wherein the sand is substantially comprised of particles which have a particle size less than about 70 mesh.

33. The method as claimed in claim 32 wherein the amount of the sand is between about 50 weight % and about 70 weight % of the reinforced gel.

34. The method as claimed in claim 33 wherein the sand is substantially comprised of particles which have a particle size less than about 100 mesh.

35. The method as claimed in claim 32 wherein the sand is comprised of particles which have a relatively wide particle size distribution.

36. A method of blocking a high permeability channel in communication with a wellbore, comprising:
   (a) introducing an amount of an unreinforced gel into the high permeability channel via the wellbore; and
   (b) introducing an amount of a reinforced gel comprising an amount of a reinforcing material into the high permeability channel via the wellbore, wherein the reinforced gel is further comprised of a polymer gel and an amount of clay.

37. The method as claimed in claim 36 wherein the amount of clay is a finite amount which is less than about 20 weight % of the reinforced gel.

38. The method as claimed in claim 36 wherein the amount of clay is a finite amount which is less than about 15 weight % of the reinforced gel.

39. The method as claimed in claim 36 wherein the method comprises introducing the unreinforced gel and subsequently introducing the reinforced gel in sequence.

40. The method as claimed in claim 39 wherein the amount of clay is a finite amount which is less than about 20 weight % of the reinforced gel.

41. The method as claimed in claim 39 wherein the amount of clay is a finite amount which is less than about 15 weight % of the reinforced gel.

42. A method of blocking a high permeability channel in communication with a wellbore, comprising:
   (a) introducing an amount of an unreinforced gel into the high permeability channel via the wellbore; and
   (b) introducing an amount of a reinforced gel comprising an amount of a reinforcing material into the high permeability channel via the wellbore;
wherein the high permeability channel is comprised of an open channel portion and a loose material portion and wherein the high permeability channel is further comprised of a wormhole resulting from a cold production process.

43. The method as claimed in claim 42 wherein the method comprises introducing the unreinforced gel and subsequently introducing the reinforced gel in sequence.

44. The method as claimed in claim 43, further comprising the step, following the step of introducing the amount of the reinforced gel into the high permeability channel, of introducing an amount of a chaser fluid into the wellbore.

45. The method as claimed in claim 43, further comprising the step, following the step of introducing the amount of the reinforced gel into the high permeability channel, of shutting in the wellbore for a period of time in order to allow for gelation of the unreinforced gel and the reinforced gel.

* * * * *